US011189062B2

United States Patent
Sasaki

(10) Patent No.: US 11,189,062 B2
(45) Date of Patent: Nov. 30, 2021

(54) IMAGE PROCESSING SYSTEM, IMAGE PROCESSING APPARATUS, NON-TRANSITORY COMPUTER READABLE MEDIUM

(71) Applicant: FUJIFILM BUSINESS INNOVATION CORP., Tokyo (JP)

(72) Inventor: Makoto Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/988,928

(22) Filed: Aug. 10, 2020

(65) Prior Publication Data

US 2021/0304454 A1    Sep. 30, 2021

(30) Foreign Application Priority Data

Mar. 27, 2020 (JP) .............................. JP2020-058482

(51) Int. Cl.
| G06T 11/00 | (2006.01) |
| G06T 11/60 | (2006.01) |
| H04N 1/60 | (2006.01) |
| G09G 3/20 | (2006.01) |

(52) U.S. Cl.
CPC ............ G06T 11/001 (2013.01); G06T 11/60 (2013.01); G09G 3/2003 (2013.01)

(58) Field of Classification Search
CPC combination set(s) only.
See application file for complete search history.

(56) References Cited

U.S. PATENT DOCUMENTS

| 2007/0216773 A1* | 9/2007 | Kojima ................ G06K 9/6212 348/207.1 |
| 2008/0231876 A1* | 9/2008 | Harada .................. H04N 1/622 358/1.9 |
| 2017/0048400 A1* | 2/2017 | Berfanger .......... H04N 1/00018 |
| 2019/0279402 A1* | 9/2019 | Panetta ..................... G06T 7/10 |
| 2019/0301941 A1* | 10/2019 | Kawabata ............... G01J 3/524 |

FOREIGN PATENT DOCUMENTS

| JP | 2011-86092 A | 4/2011 |
| JP | 2011-248641 A | 12/2011 |

OTHER PUBLICATIONS

Ozawa, Kazushi et al., "Understanding Customer Preferences and Designing Sales Materials Using Preference Models" No. 23 pp. 4-15, 2014.

* cited by examiner

Primary Examiner — Wesner Sajous
(74) Attorney, Agent, or Firm — Oliff PLC

(57) ABSTRACT

An image processing apparatus includes a processor configured to determine a color distribution of a processing target image and a color distribution of multiple sample colors prepared in advance as a set and perform an operation to modify a color of the processing target image in accordance with a relationship between the color distribution of the processing target image and the color distribution of the sample colors.

14 Claims, 26 Drawing Sheets

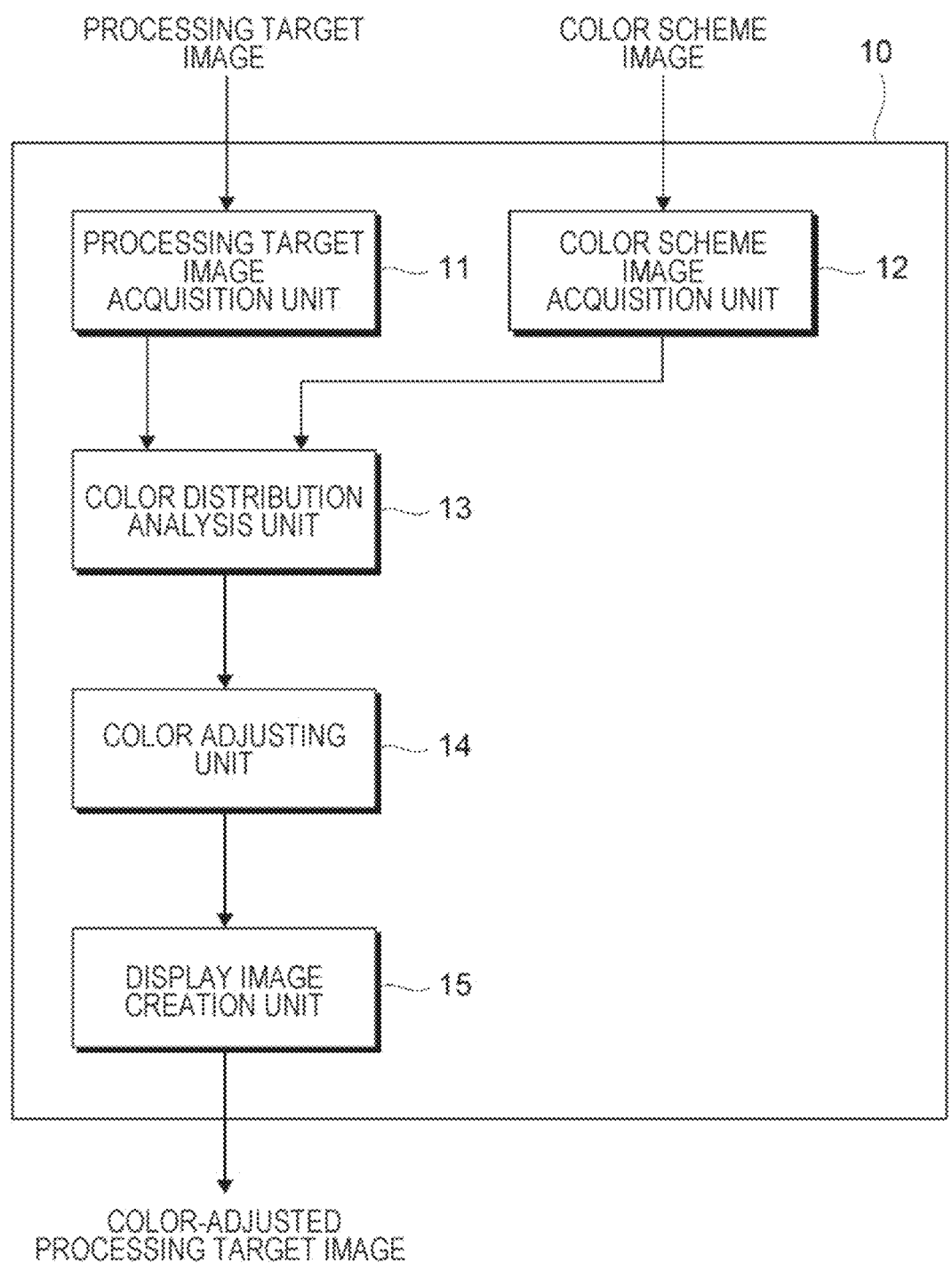

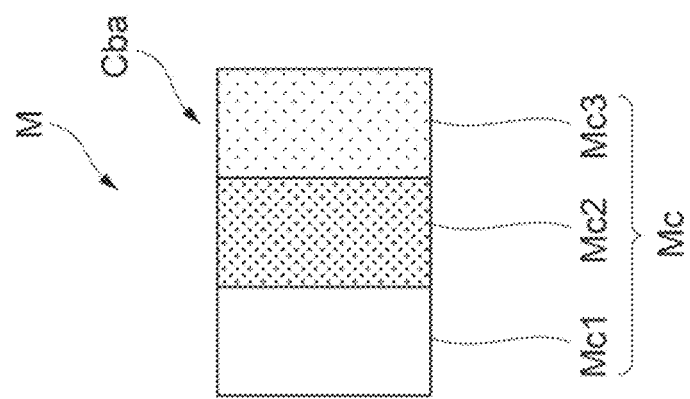
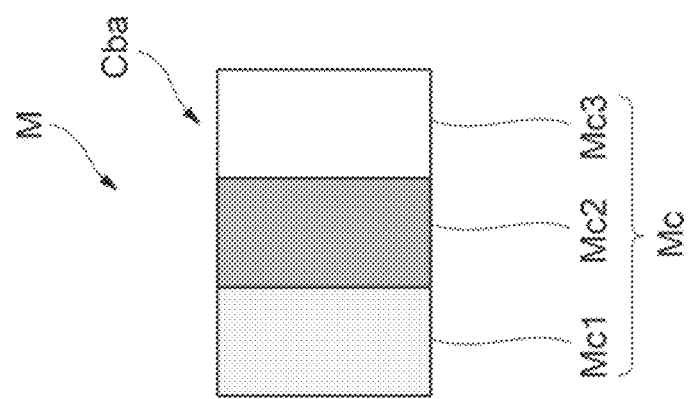
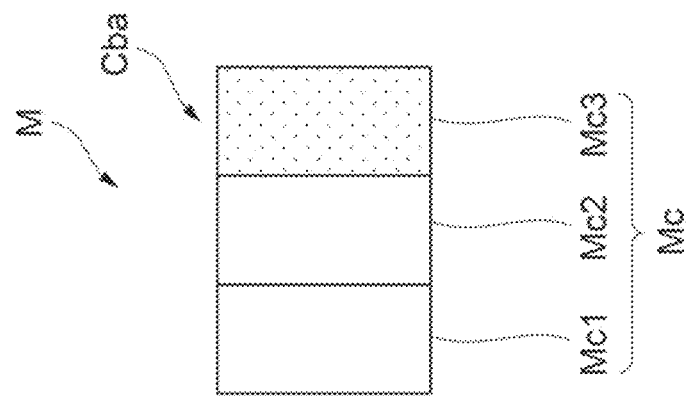

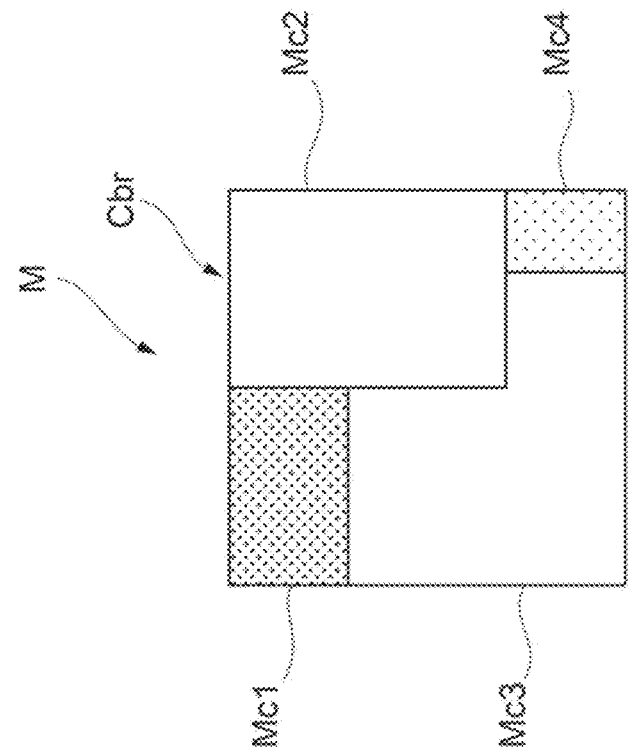
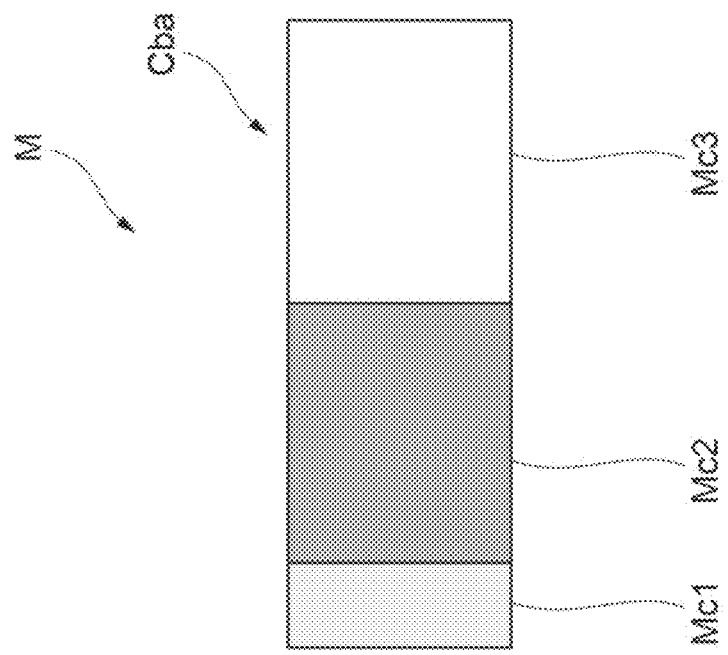

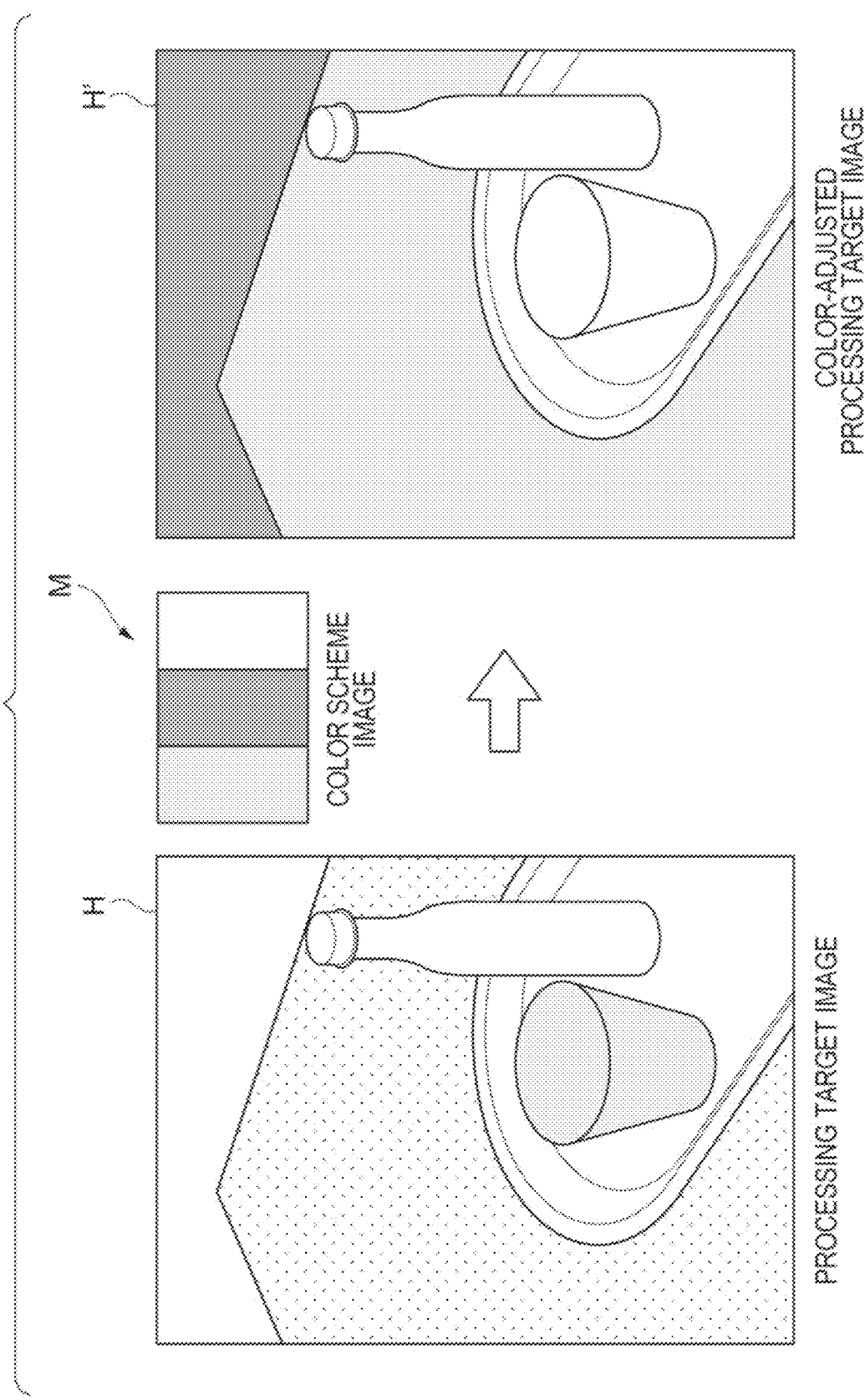

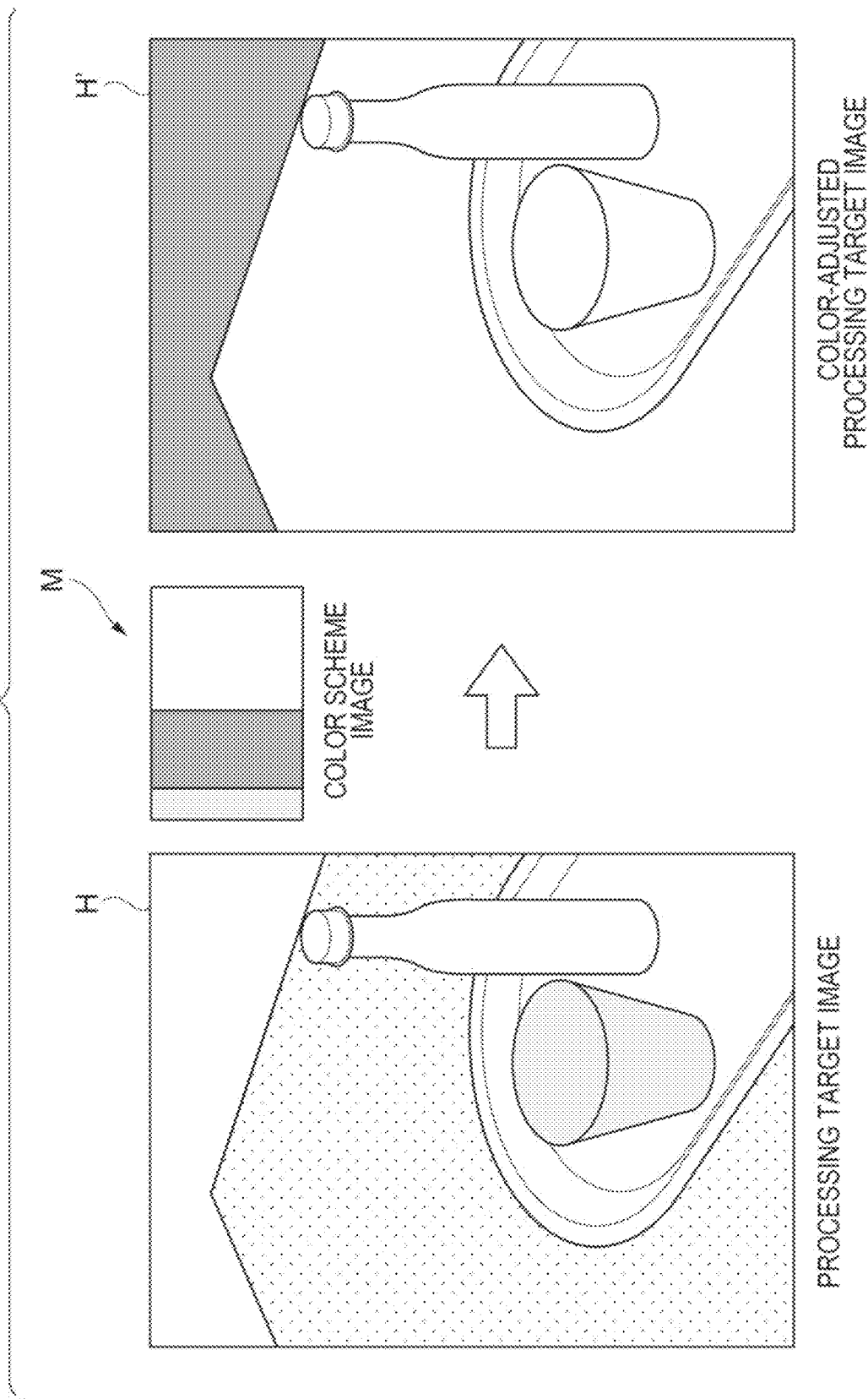

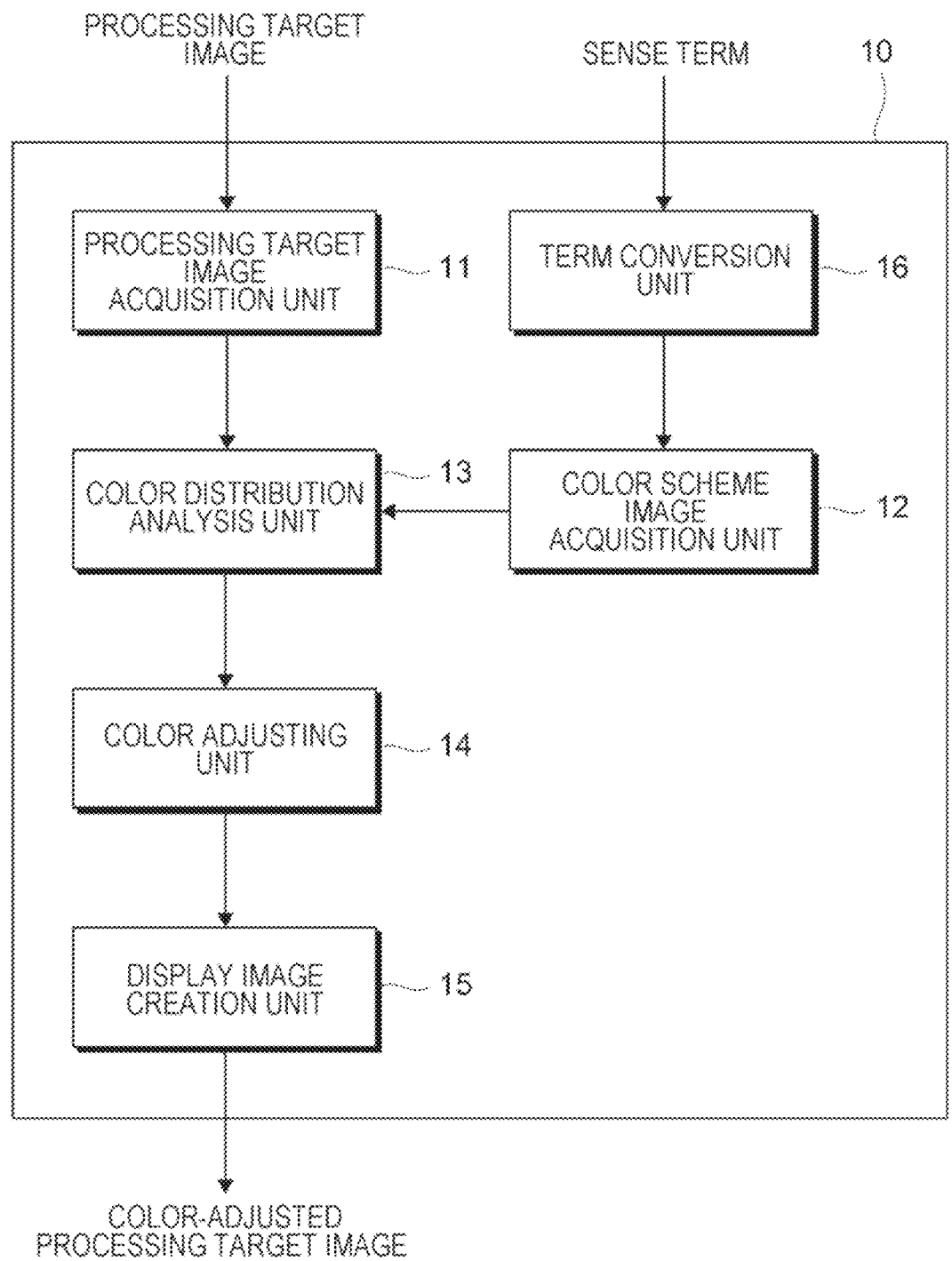

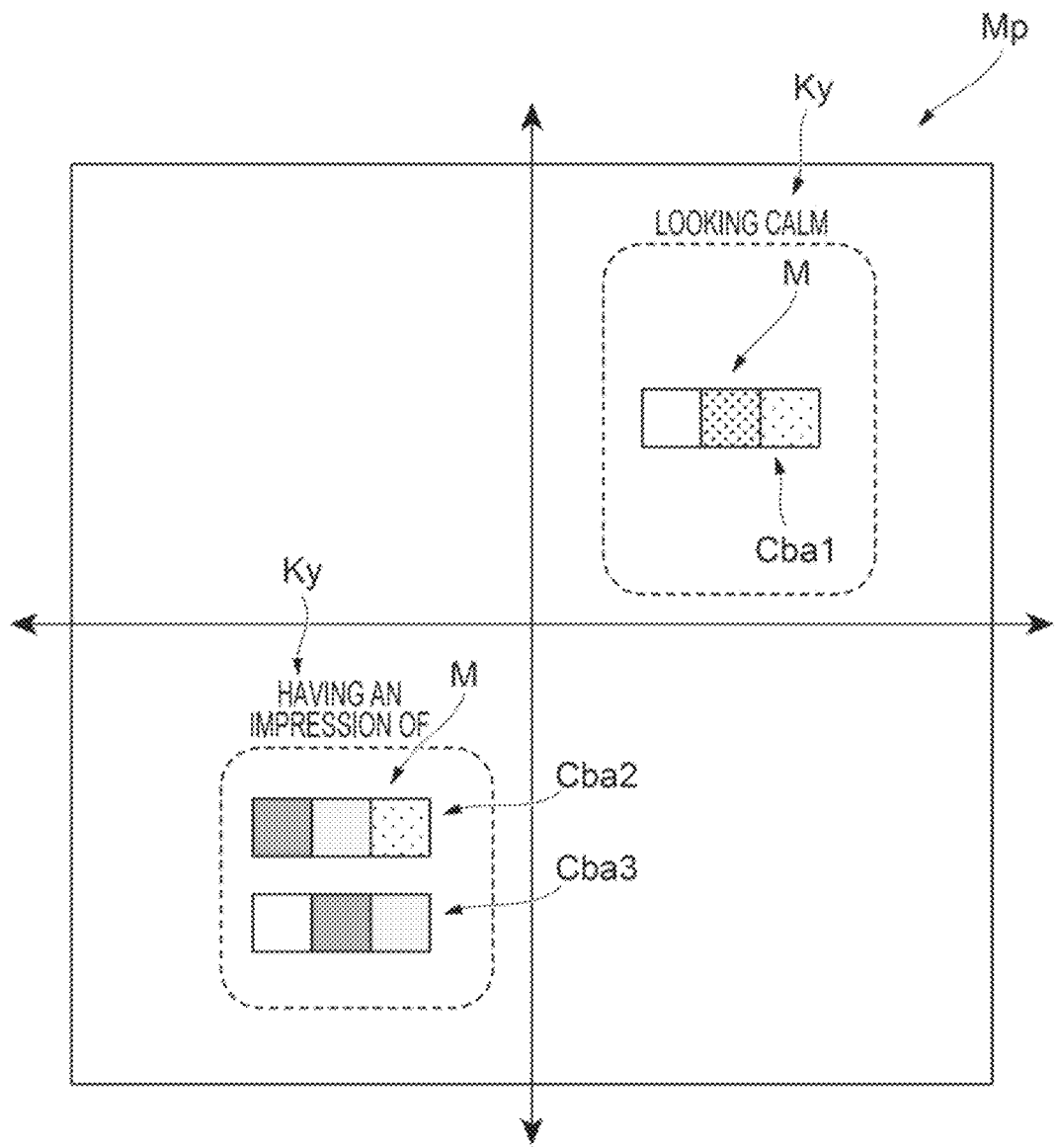

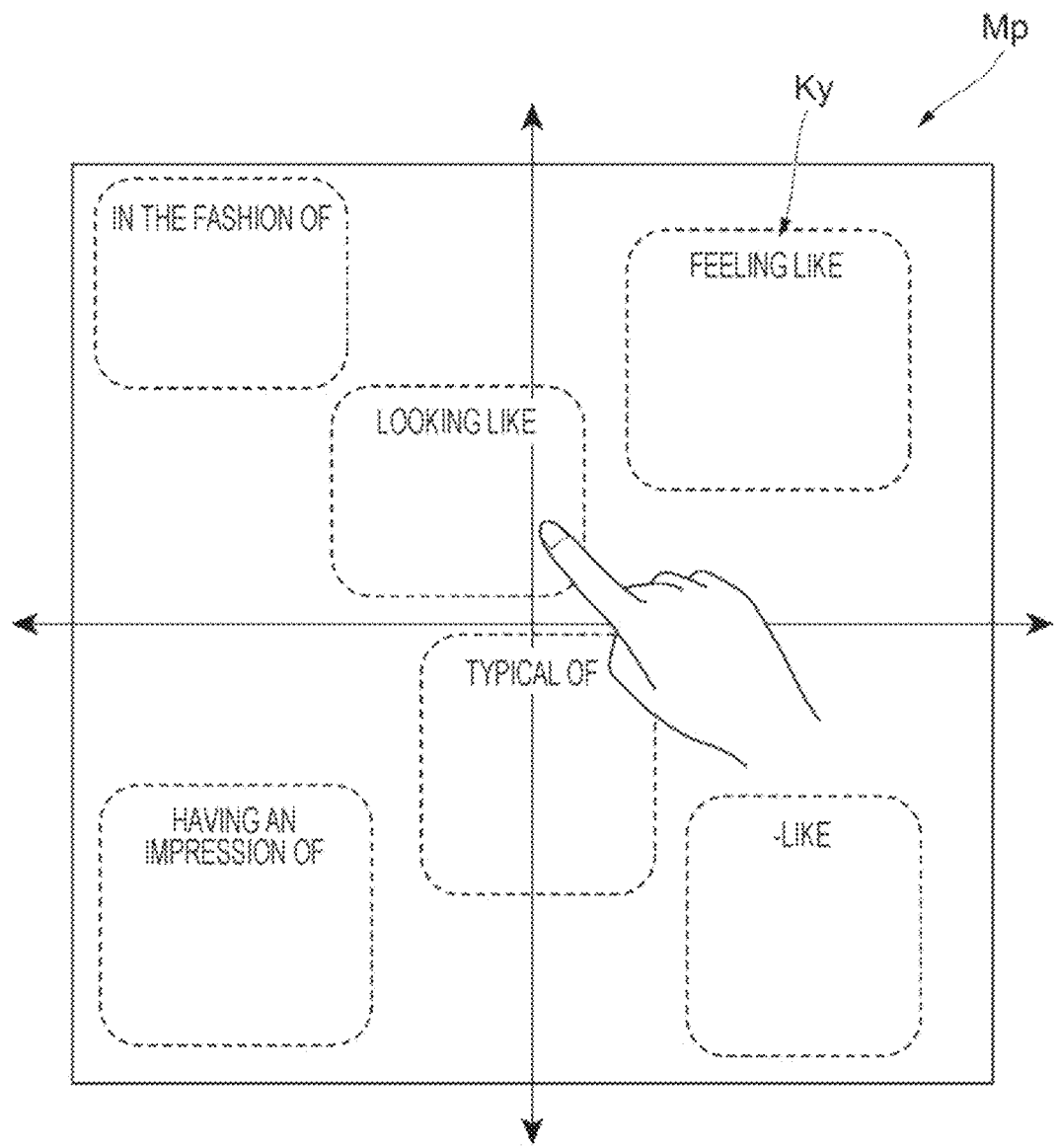

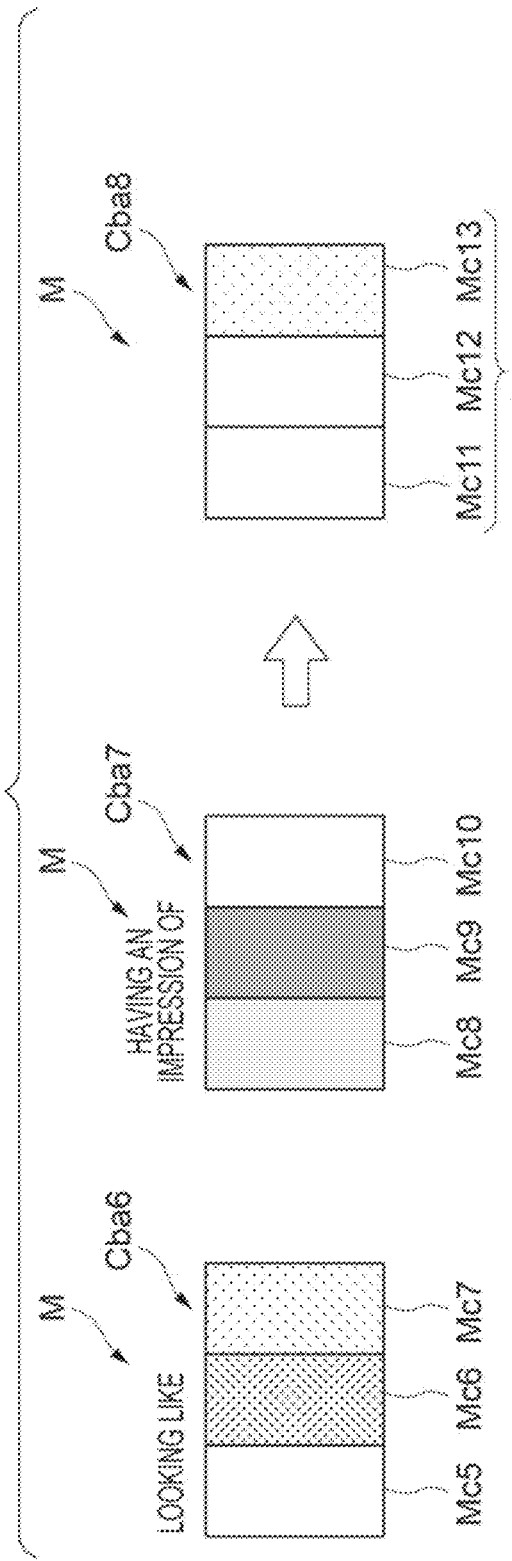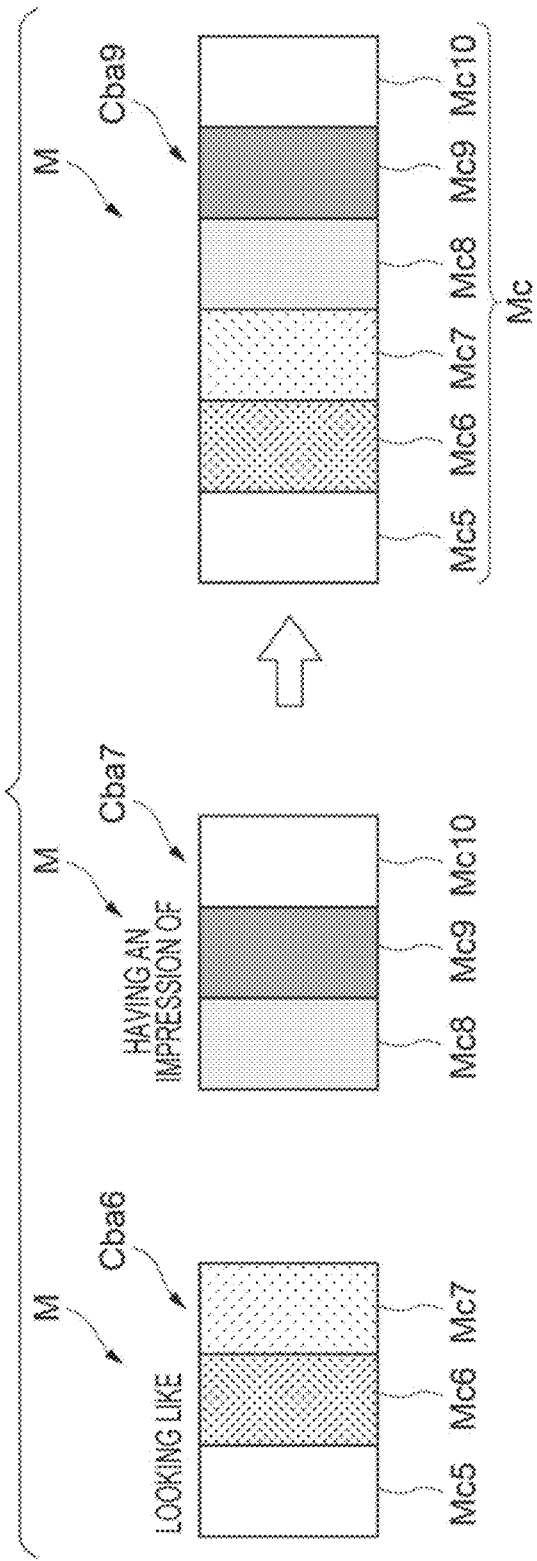

IMAGE PROCESSING SYSTEM, IMAGE PROCESSING APPARATUS, NON-TRANSITORY COMPUTER READABLE MEDIUM

CROSS-REFERENCE TO RELATED APPLICATIONS

This application is based on and claims priority under 35 USC 119 from Japanese Patent Application No. 2020-058482 filed Mar. 27, 2020.

BACKGROUND

(i) Technical Field

The present disclosure relates to an image processing system, an image processing apparatus, and a non-transitory computer readable medium.

(ii) Related Art

The color scheme of video content influences purchase motivation and sales. It is challenging to determine how colors of web design, package design, brochures, or articles are combined. To meet such needs, the service of analyzing and quantifying the color scheme of video content has been increasingly available recently. Using such a service, studies have been made to analyze the histogram of colors of and the distribution of hue and chroma of colors of an image of a well-sold design.

Japanese Unexamined Patent Application Publication No. 2011-248641 discloses a color scheme simulation system. The color scheme simulation system includes a model image database, model image display, color solid display, instruction unit, and controller. The model image database stores multiple pieces of color scheme region data related to model image data and representative color data of each piece of the color scheme region data. The model image display displays the model image data. The color solid display displays a specific color solid on which the representative color data is attached. The instruction unit issues an instruction to modify the representative color data in response to a sense term. The controller modifies the displaying on the model image display in response to the modification instruction and the displaying of the representative color data on the color solid display.

Japanese Unexamined Patent Application Publication No. 2011-86092 discloses a color scheme conversion apparatus. The color scheme conversion apparatus includes a color characteristic database, color difference analysis information database, and conversion rule database. The color scheme conversion apparatus analyzes the distribution of the color scheme acquired on a display and stores information related to the definition of color on the color characteristic database. The color scheme conversion apparatus classifies the analyzed color scheme into color scheme type by analyzing a color difference and stores information used to analyze the color difference on the color difference analysis information database. The color scheme conversion apparatus converts the color scheme on the acquired image by modifying the color difference in response to the classified color scheme type and stores a rule related to the modification of the color difference on the conversion rule database. The color scheme conversion apparatus outputs conversion results of the color scheme.

Without analyzing the colors used in images, a basic rule or a theory of harmony may be present on the color scheme that people like. Such human cognitive mechanism may be applied to color scheme. For example, similarity harmony may be implemented by combining colors of similar hues, identical harmony may be implemented by using colors of the same hue, or contrast harmony may be implemented by using highly saturated complementary colors to vividly stand out against each other.

A desirable color scheme pattern or a theory of harmony may be available. If applying the color scheme or the theory of harmony is actually attempted to a variety of images, colors to be applied may be changed or interchanged on each of elements or objects in an image in a persistent effort. Adjustment may be performed in view of the balance of entire harmony and a lot of work may be performed before user reaches the desirable status.

SUMMARY

Aspects of non-limiting embodiments of the present disclosure relate to providing an image processing apparatus that reduces workload of a user more by reflecting on the color scheme of a processing target image in accordance with a color scheme pattern prepared in advance than when the user adjusts a color of the processing target image and a modified color of the processing target image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus. The image processing apparatus includes a processor configured to determine a color distribution of a processing target image and a color distribution of multiple sample colors prepared in advance as a set, and perform an operation to modify a color of the processing target image in accordance with a relationship between the color distribution of the processing target image and the color distribution of the sample colors.

BRIEF DESCRIPTION OF THE DRAWINGS

Exemplary embodiments of the present disclosure will be described in detail based on the following figures, wherein:

FIG. 2 is a functional block diagram illustrating an image processing apparatus of a first exemplary embodiment;

FIGS. 3A through 3C illustrate examples of color scheme images;

FIGS. 5A and 5B illustrate the weight of each sample color that is denoted by size area;

FIG. 6 illustrates a first example of a screen displayed on a display when color adjustment is performed;

FIG. 7 illustrates a second example of the screen displayed on the display when the color adjustment is performed;

FIG. 8 is a functional block diagram illustrating an image processing apparatus of a second exemplary embodiment;

FIG. 10 illustrates another example in which a preference model is linked to a color scheme image;

FIG. 11 illustrates a first example of a process that is performed when a user selects a sense term on a map;

FIGS. 16A and 16B illustrate examples in which a new color bar is created;

DETAILED DESCRIPTION

Figure 1:
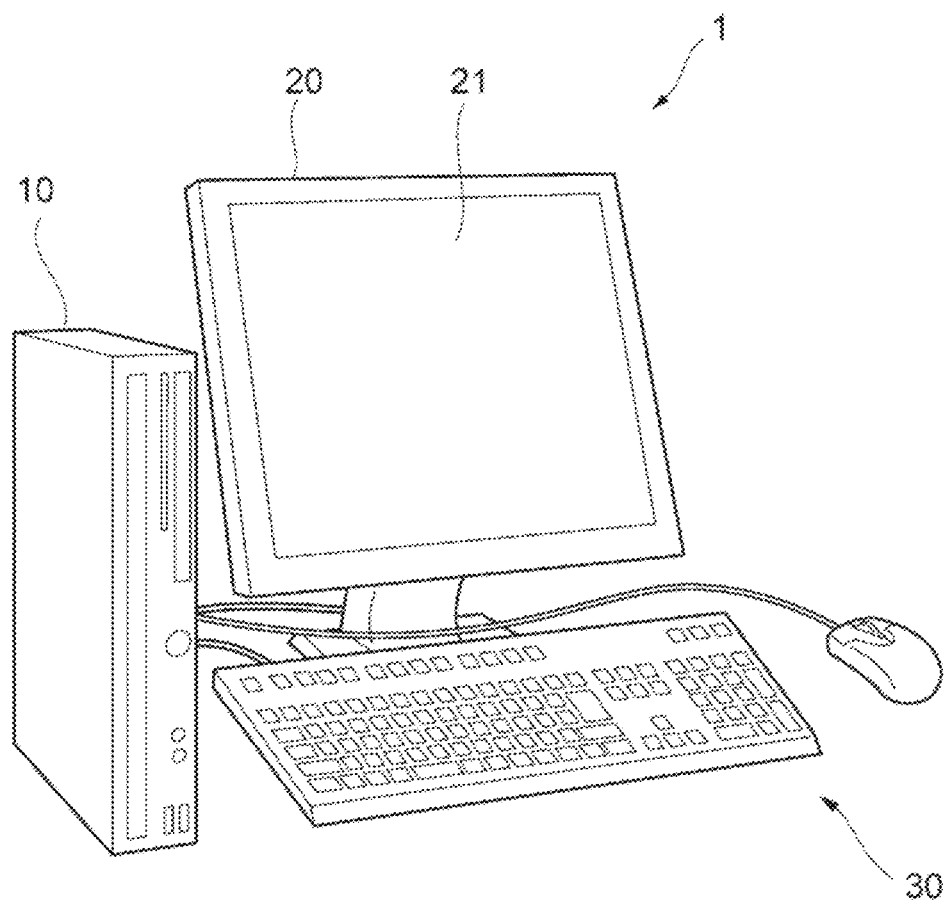
FIG. 1 illustrates a configuration of an image processing system of exemplary embodiments of the disclosure.

Referring to the drawings, exemplary embodiments of the disclosure are described below.

Image Processing System

FIG. 1 illustrates a configuration of an image processing system 1 of exemplary embodiments. As illustrated in FIG. 1, the image processing system 1 includes an image processing apparatus 10, display 20, and input apparatus 30. The image processing apparatus 10 performs an image processing process on image information on an image displayed on the display 20. The display 20 receives the image information created by the image processing apparatus 10 and displays an image in accordance with the image information. The input apparatus 30 is used to receive a variety of information a user inputs on the image processing apparatus 10.

The image processing apparatus 10 is a general-purpose personal computer (PC). The image processing apparatus 10, under the control of an operating system (OS), operates a variety of software applications, thus creating image information.

The image processing apparatus 10 includes a central processing unit (CPU), memory, and storage, such as a hard disk drive (HDD) or solid-state drive (SSD). The CPU is a kind of processor and executes OS and software applications. The memory stores data used to execute a variety of software applications and the storage stores data input to the software applications and data output from the software applications.

The image processing apparatus 10 further includes a communication interface (hereinafter referred to as a communication I/F) used to communicate with external devices, and input devices including a keyboard, mouse, touch panel and/or stylus pen.

The display 20 displays an image on the display screen 21. The display 20 displays the image in additive mixture of color and may be a liquid-crystal display for PC, liquid-crystal television or projector. The display 20 is not limited to liquid-crystal type. Referring to FIG. 1, the display screen 21 is arranged on the display 20. If a projector is used as the display 20, the display screen 21 is a screen arranged external to the display 20.

The input apparatus 30 includes a keyboard and mouse. The input apparatus 30 starts up or ends a software application for an image processing process. The input apparatus 30 is also used to enter an instruction for the image processing apparatus 10 to perform the image processing process.

The image processing apparatus 10 is connected to the display 20 via a digital visual interface (DVI). The image processing apparatus 10 and display 20 may also be connected to each other via high-definition multimedia interface (HDMI (registered trademark)) or DisplayPort.

The image processing apparatus 10 is connected to the input apparatus 30 via a universal serial bus (USB). The image processing apparatus 10 and the input apparatus 30 may also be connected to each other via IEEE1394 or RS-232C interface.

According to the exemplary embodiments, the image processing process is performed as described detail below. In the image processing process, the color distribution of a processing target image is caused to match the color distribution of sample colors. The color scheme of the sample colors is thus reflected on the color scheme of the processing target image and the impression of the processing target image thus becomes close to the impression of the sample color.

The display 20 in the image processing system 1 first displays a sample color and a processing target image that is an image prior to the image processing process. When a user gives to the image processing apparatus 10 an instruction to perform the image processing process using the input apparatus 30, the image processing apparatus 10 performs the image processing process on image information on the processing target image. The results of the image processing process are reflected on an image displayed on the display 20. The processing target image having undergone the image processing process is thus displayed on the display 20. In this case, the user may perform image processing while viewing the display 20.

The image processing system 1 of the exemplary embodiments is not limited to the configuration in FIG. 1. For example, the image processing system 1 may be a tablet terminal. The tablet terminal may include a touch panel. The touch panel may display an image and receive an instruction from the user. In other words, the touch panel functions as the display 20 and input apparatus 30. Similarly, a touch monitor may be used as an apparatus into which the display 20 and input apparatus 30 are integrated. In this case, the touch panel is used as the display screen 21 in the display 20. The image processing apparatus 10 creates image information and displays an image on the touch monitor in accordance with the image information. The user may enter an instruction for the image processing process by touching the touch monitor.

According to related art techniques, a distribution having a feature of a better image is analyzed and quantized as data. Although the user may refer to the quantized data, it is difficult to reflect the feature on another image and reproduce the impression of the better image.

Related art techniques have provided a system that allows an intuitive operation to be performed or a method that interchanges efficiently color code of hypertext markup language (HTML). In a mechanism of such related art, multiple regions that may serve partially as a strict color scheme target are determined, the color of the regions as the target is modified, and an association database of sense and color is used in assistance to combine a colors.

The exemplary embodiments implement an operation to prepare in advance multiple sample colors representing the impression of an image and reflect the sample color on an image quality of the processing target image.

The image processing apparatus 10 implementing this operation is described below.

Configuration of Image Processing Apparatus

First Exemplary Embodiment

A first exemplary embodiment is described. According to the first exemplary embodiment, a color scheme pattern is prepared in advance. When the user selects a color scheme image, the color scheme of the color scheme image is reflected on the color scheme of a processing target image.

FIG. 2 is a functional block diagram illustrating an image processing apparatus 10 of the first exemplary embodiment. Referring to FIG. 2, the image processing apparatus 10 includes a processing target image acquisition unit 11, color scheme image acquisition unit 12, color distribution analysis unit 13, color adjusting unit 14, and display image creation unit 15. The processing target image acquisition unit 11 acquires a processing target image. The color scheme image acquisition unit 12 acquires a color scheme image. The color distribution analysis unit 13 analyzes the color distributions of the processing target image and color scheme image. The color adjusting unit 14 reflects the color distribution of the color scheme image on the color distribution of the processing target image. The display image creation unit 15 creates a display image to be displayed on the display 20.

The processing target image acquisition unit 11 acquires the processing target image. According to the first exemplary embodiment, the processing target image is a target image on which color adjustment is performed in the image processing process. The processing target image is determined when the user selects an image that is to undergo the color adjustment and the processing target image acquisition unit 11 acquires the processing target image selected by the user.

The color scheme image acquisition unit 12 acquires the color scheme image. According to the first exemplary embodiment, the color scheme image includes multiple sample colors that are combined in advance as a set. The color scheme image may also be understood as a predetermined color scheme pattern.

The combination of sample colors may be linked with a specific impression, such as "cool", "warm", "soft", or "hard". The combination may include multiple selected colors that are likely to be used for an image making such impressions. The color may be the one that is empirically selected as a color linked to one of these impressions.

The color scheme image, if selected by the user, is determined and the color scheme image acquisition unit 12 then acquires the color scheme image selected by the user.

FIGS. 3A through 3C illustrate examples of the color scheme image. A color scheme image M is displayed as a color bar Cba. The color bar Cba includes multiple sample colors Mc arranged side by side in one direction. The color bar Cba displayed includes three sample colors Mc1 through Mc3 arranged.

The user may thus intuitively understand the color scheme image M displayed as the color bar Cba.

The color distribution analysis unit 13 determines the color distribution of the processing target image and the color distribution of the color scheme image M. The color distribution may be understood as the feature value of the processing target image or the color scheme image M. The color distribution may thus be represented by the mean, dispersion, or histogram of each color component forming the image. Used herein as the color distribution is an arithmetic mean as an example of the mean or a standard deviation as an example of the dispersion.

The color distribution analysis unit 13 performs color conversion on image information (input image data) that the display 20 uses to display the processing target image and color scheme image M. The image information is herein video data of RGB (red, green, and blue). For example, the RGB data is converted into $L\alpha\beta$ data. Specifically, chromaticity in the RGB color space is converted to chromaticity in the $L\alpha\beta$ space. The $L\alpha\beta$ color space is a color space that is designed to be statistically orthogonal by analyzing, in terms of a component, LMS complex response to a nature image. The $L\alpha\beta$ color space is invented based on human perception. In this case, L, $\alpha$, and $\beta$ respectively represent value (L), yellow-blue axis ($\alpha$), and red-green axis ($\beta$).

Let $(L_s, \alpha_s, \beta_s)$ represent pixel values of the processing target image and $(L_t, \alpha_t, \beta_t)$, pixel values of the color scheme image M.

The color distribution analysis unit 13 calculates the arithmetic mean of the pixel values $(L_s, \alpha_s, \beta_s)$ of the processing target image and the arithmetic mean of the pixel values $(L_t, \alpha_t, \beta_t)$ of the color scheme image M. The calculation operation is expressed in upper and lower equations (1). The upper equation (1) expresses the arithmetic mean of $(L_s, \alpha_s, \beta_t)$ and the lower equation (1) expresses the arithmetic mean of $(L_t, \alpha_t, \beta_t)$.

$$(\overline{L}_s, \overline{\alpha}_s, \overline{\beta}_s)$$

$$(\overline{L}_t, \overline{\alpha}_t, \overline{\beta}_t) \quad (1)$$

The color distribution analysis unit 13 calculates the standard deviations $(\sigma_{s,L}, \sigma_{s,\alpha}, \sigma_{s,\beta})$ of the pixel values $(L_s, \alpha_s, \beta_s)$ of the processing target image and the standard deviations $(\sigma_{t,L}, \sigma_{t,\alpha}, \sigma_{t,\beta})$ of the pixel values $(L_t, \alpha_t, \beta_t)$ of the color scheme image M.

Turning back to FIG. 2, the color adjusting unit 14 performs color adjustment to reflect the color scheme of the color scheme image M on the color scheme of the processing target image. In the color adjustment herein, the color adjusting unit 14 performs an operation to modify the color of the processing target image in accordance with the relationship between the color distribution of the processing target image and the color distribution of the sample color Mc.

Specifically, the color adjusting unit 14 converts the pixel values $(L_s, \alpha_s, \beta_s)$ of the processing target image to the pixel values $(L_o, \alpha_o, \beta_o)$ in the color conversion, using the arithmetic mean and standard deviation in accordance with equations (2):

$$L_O = (L_s - \overline{L_s})\frac{\sigma_{t,L}}{\sigma_{s,L}} + \overline{L_t} \qquad (2)$$

$$\alpha_O = (\alpha_s - \overline{\alpha_s})\frac{\sigma_{t,\alpha}}{\sigma_{s,\alpha}} + \overline{\alpha_t}$$

$$\beta_O = (\beta_s - \overline{\beta_s})\frac{\sigma_{t,\beta}}{\sigma_{s,\beta}} + \overline{\beta_t}$$

The display image creation unit 15 creates image information on the pixel values color-adjusted by the color adjusting unit 14 and outputs the image information. The image information subsequent to the color adjustment is transmitted to the display 20. The display 20 thus displays an image in accordance with the image information.

Through the above process, the color distribution of the color scheme image M is reflected on the color distribution of the processing target image. The color adjustment is thus performed to modify the impression of the processing target image to the impression based on the color scheme image M. According to the first exemplary embodiment, the color distribution analysis unit 13 and color adjusting unit 14 convert the image information expressed by chromaticity in the RGB color space into the image information in the Lαβ color space and perform the process using chromaticity in the Lαβ color space. The disclosure is not limited to this method. The process may be performed through the conversion from the RGB color space to the RGB color space or may be performed using chromaticity in L*a*b* color space.

Figure 4:
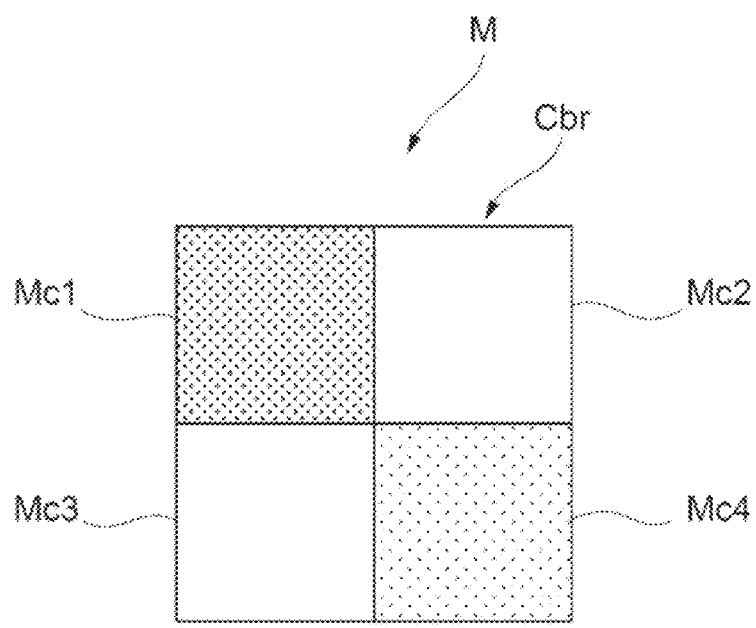
FIG. 4 illustrates another example of the color scheme image.

The color scheme image M is not limited to the one illustrated in FIG. 3. FIG. 4 illustrates another example of the color scheme image M. The color scheme image M is displayed as a color block Cbr. The color block Cbr is a combination of multiple sample colors Mc arranged vertically and horizontally. The color block Cbr illustrated in FIG. 4 is a combination of four sample colors Mc1 through Mc4.

The sample color Mc may not necessarily be displayed as the color scheme image M but may be presented to the user as the image information. In such a case, the display screen 21 in the display 20 displays the image information, such as RGB=(0, 50, 100), (50, 50, 200), and (200, 100, 0).

When the color distribution of the color scheme image M is reflected on the color distribution of the processing target image, the color adjustment may be performed using the weight of each of the sample colors Mc forming the color scheme image M. For example, among the sample colors Mc, a color closer to a color that is included at the highest occurrence of frequency in the processing target image is weighted more heavily than other colors. In this case, the color-adjusted image is likely to be more natural.

Weights of the sample colors Mc may be predetermined. The color scheme image M may be displayed with the weight represented by area size. An area filled with each sample color of the sample color Mc is used as a weight when the process is performed. The user thus intuitively understands the weights.

FIGS. 5A and 5B illustrate the weights of the sample colors Mc as the sizes of areas.

FIG. 5A illustrates the color bar Cba. In the sample colors Mc1 through Mc3, the sample color Mc1 has a minimum weight, the sample color Mc3 has a maximum weight, and the sample color Mc2 has a weight somewhere therebetween (Mc1<Mc2<Mc3).

FIG. 5B illustrates the color block Cbr. The weights of the sample colors Mc1 through Mc4 are related as Mc4<Mc1<Mc2<Mc3.

The areas may be set to be modifiable by the user. In addition to the sample colors Mc prepared in advance, the user may further add another sample color Mc.

FIG. 6 illustrates a first example of a screen displayed on the display screen 21 on the display 20 when the color adjustment is performed.

A processing target image H is displayed on the left-hand side portion of FIG. 6. The color scheme image M in FIG. 3B is displayed in the center portion of FIG. 6. The processing target image H and/or the color scheme image M may be selected by the user. A color-adjusted processing target image H' is illustrated in the right-hand portion of FIG. 6B.

According to the first exemplary embodiment, the processing target image H and the color scheme image M serving as an example of multiple sample colors Mc are displayed side by side. The color adjustment is thus performed in accordance with the color scheme image M selected by the user.

FIG. 7 illustrates a second example of the screen displayed on the display screen 21 of the display 20 when the color adjustment is performed.

The layout of the processing target image H, the color scheme image M, and the color-adjusted processing target image H' on the screen is identical to the layout in FIG. 6. However, the color scheme image M is changed to the color scheme image M in FIG. 5A and the color adjustment is performed in accordance with the weighting described above. As a result, the color-adjusted processing target image H' that has undergone the color adjustment different from the color adjustment displayed in FIG. 6 is thus displayed.

Second Exemplary Embodiment

A second exemplary embodiment is described below. According to the second exemplary embodiment, the user selects a sense term that represents an impression of an image and the sample colors Mc are acquired in accordance with the sense term.

FIG. 8 is a functional block diagram illustrating the image processing apparatus 10 of the second exemplary embodiment.

As illustrated in FIG. 8, the image processing apparatus 10 of the second exemplary embodiment is different from the image processing apparatus 10 in FIG. 2 in that the image processing apparatus 10 of the second exemplary embodiment additionally includes a term conversion unit 16. The functions of the processing target image acquisition unit 11, color scheme image acquisition unit 12, color distribution analysis unit 13, color adjusting unit 14, and display image creation unit 15 remain unchanged from those of the first exemplary embodiment. The following discussion focuses on the term conversion unit 16.

The term conversion unit 16 converts a sense term selected by the user into the sample colors Mc. The sense term is an example of term and is a word that expresses the impression of an image. The sense term and the sample colors Mc are linked to a predetermined sense and the linking is stored on a memory. The memory may be included in the image processing apparatus 10. The memory may be an external apparatus, such as a cloud server, and the term conversion unit 16 may download the linking from the external apparatus.

Figure 9A:
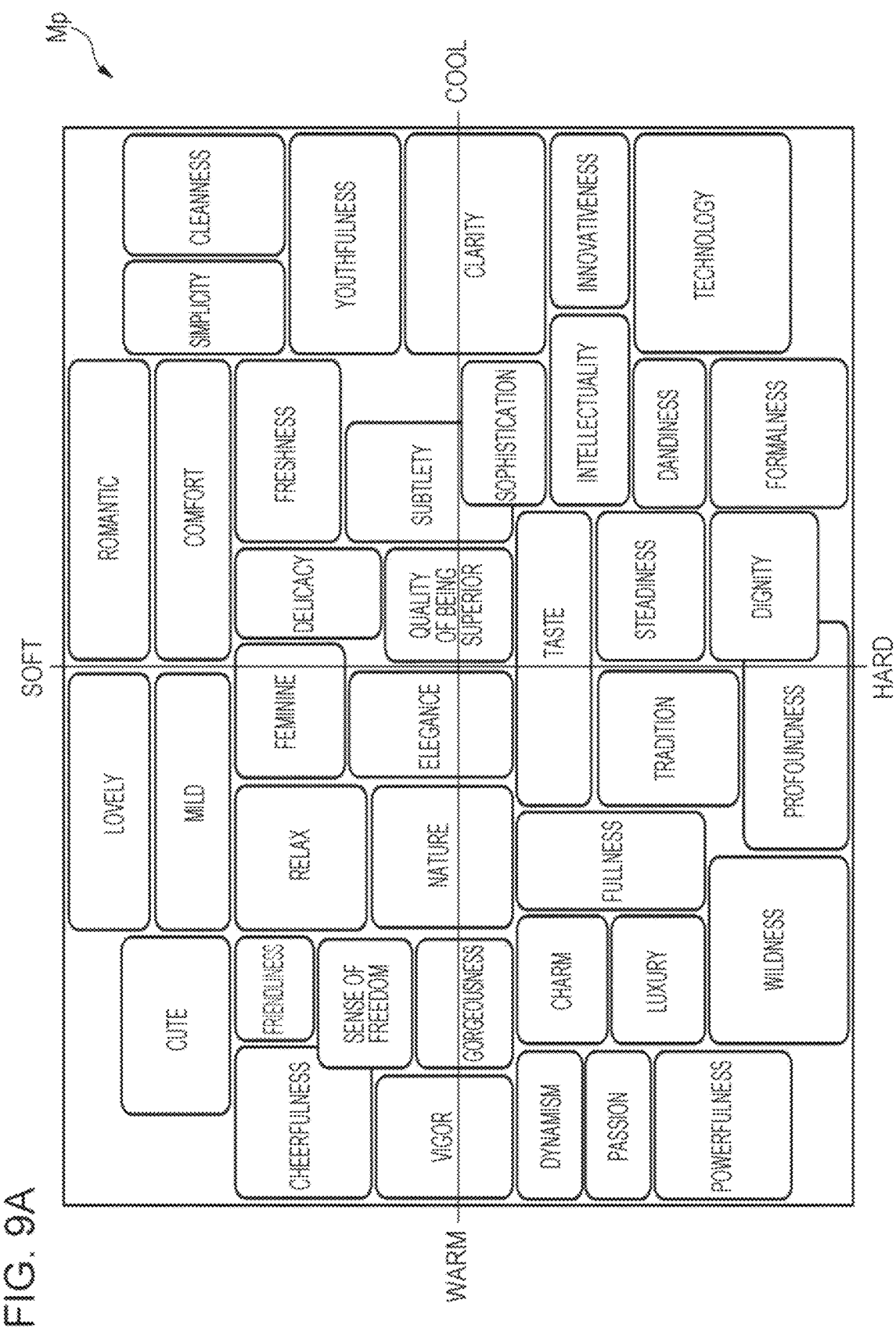
FIGS. 9A and 9B illustrates a relationship between sense terms and a color scheme image including multiple sample colors.
Figure 9B:
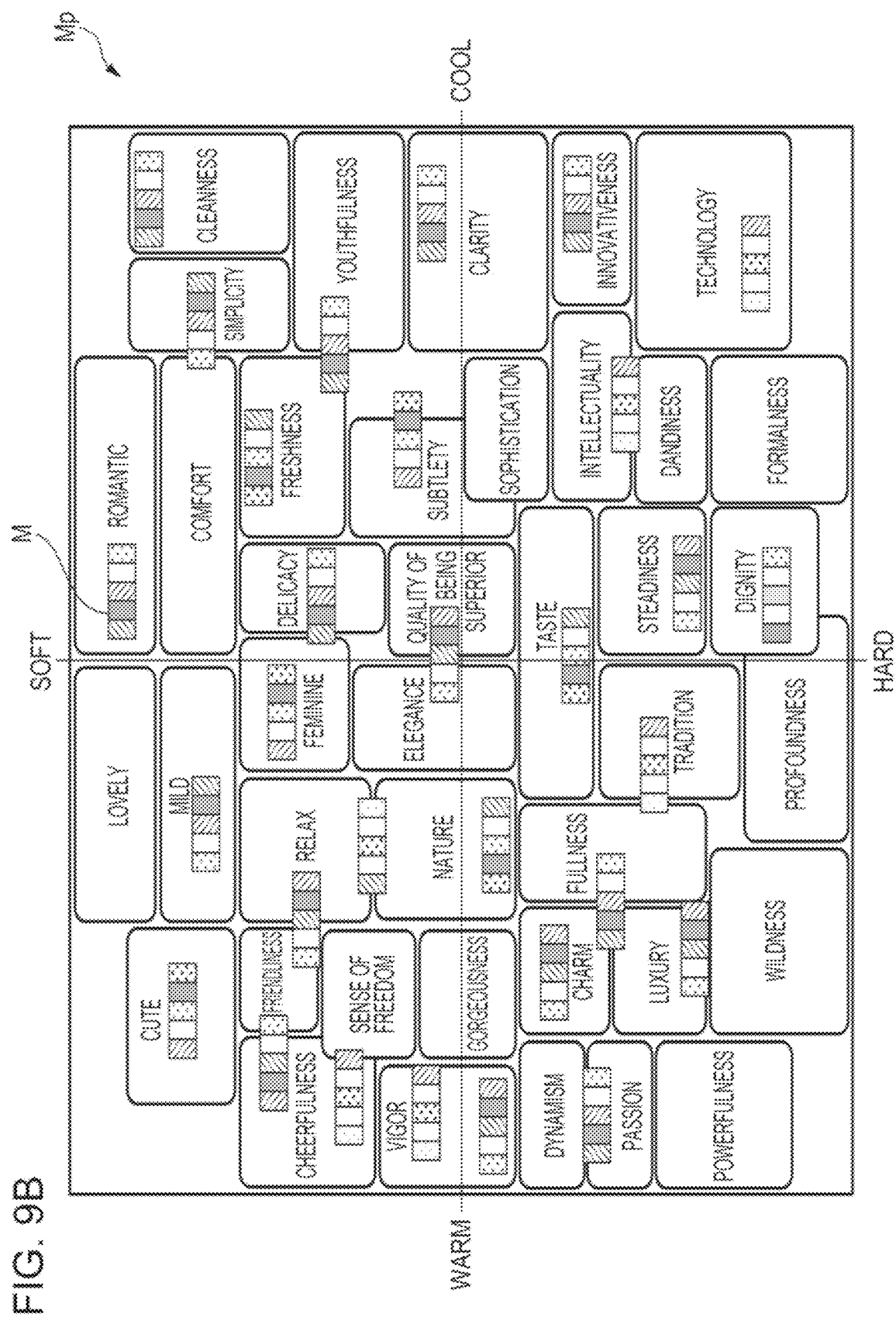

FIGS. 9A and 9B illustrate a relationship between sense terms Ky and the color scheme images M including the multiple sample colors Mc. FIG. 9A illustrates a preference model.

The preference model is a classification of images that a person may have on an object in terms of preference. The preference model disclosed in "Understanding Customer Preferences and Designing Sales Materials Using Preference Model", Fuji Xerox Technical Report No. 23 2014 is described herein. This preference model represents the image with a map Mp defined by two mutually orthogonal axes WARM-COOL and SOFT-HARD. The sense terms Ky, such as "lovely", "romantic", "cute", and the like are placed on the map Mp. The terms are placed where the sense term Ky and an image represented by the preference model match. The two axes may be determined in accordance with any criteria.

FIG. 9B links the preference model to the color scheme image M. In the map Mp representing the preference model, the color scheme image M is arranged in response to the sense term Ky. The sample colors Mc linked to the sense term Ky selected by the user are thus acquired using the relationship in FIG. 9B.

FIG. 10 illustrates another example in which a preference model is linked to a color scheme image M. Referring to FIG. 10, the sense terms Ky "looking calm" and "having an impression of" correspond to the color scheme image M. The sense term Ky "looking calm" corresponds to a color bar Cba1 as the color scheme image M. The sense term Ky "having an impression of" corresponds to two color bars Cba2 and Cba3 as the color scheme image M. In this way, a single sense term Ky may correspond to one or more color scheme images M. The color adjustment is thus performed using the multiple color scheme images M.

The color scheme image M illustrated in FIG. 9B is not necessarily presented to the user and only the preference model in FIG. 9A may be presented to the user.

When the user has selected one of the sense terms Ky on the map Mp, the color scheme image M is determined and the color adjustment is performed.

FIG. 11 illustrates a first example of a process that is performed when the user selects the sense term Ky on the map Mp.

The user may select the sense term Ky by touching a region on the map Mp labeled with the sense term Ky. FIG. 11 illustrates such regions defined by broken lines. Referring to FIG. 11, the color scheme image M is not displayed and a location "looking like" on the map Mp is touched. The location of a region of the map Mp labeled with the sense term Ky determines the weight of each of the sample colors Mc forming the color scheme image M and the color adjustment is thus performed through the weighting.

Figure 12:
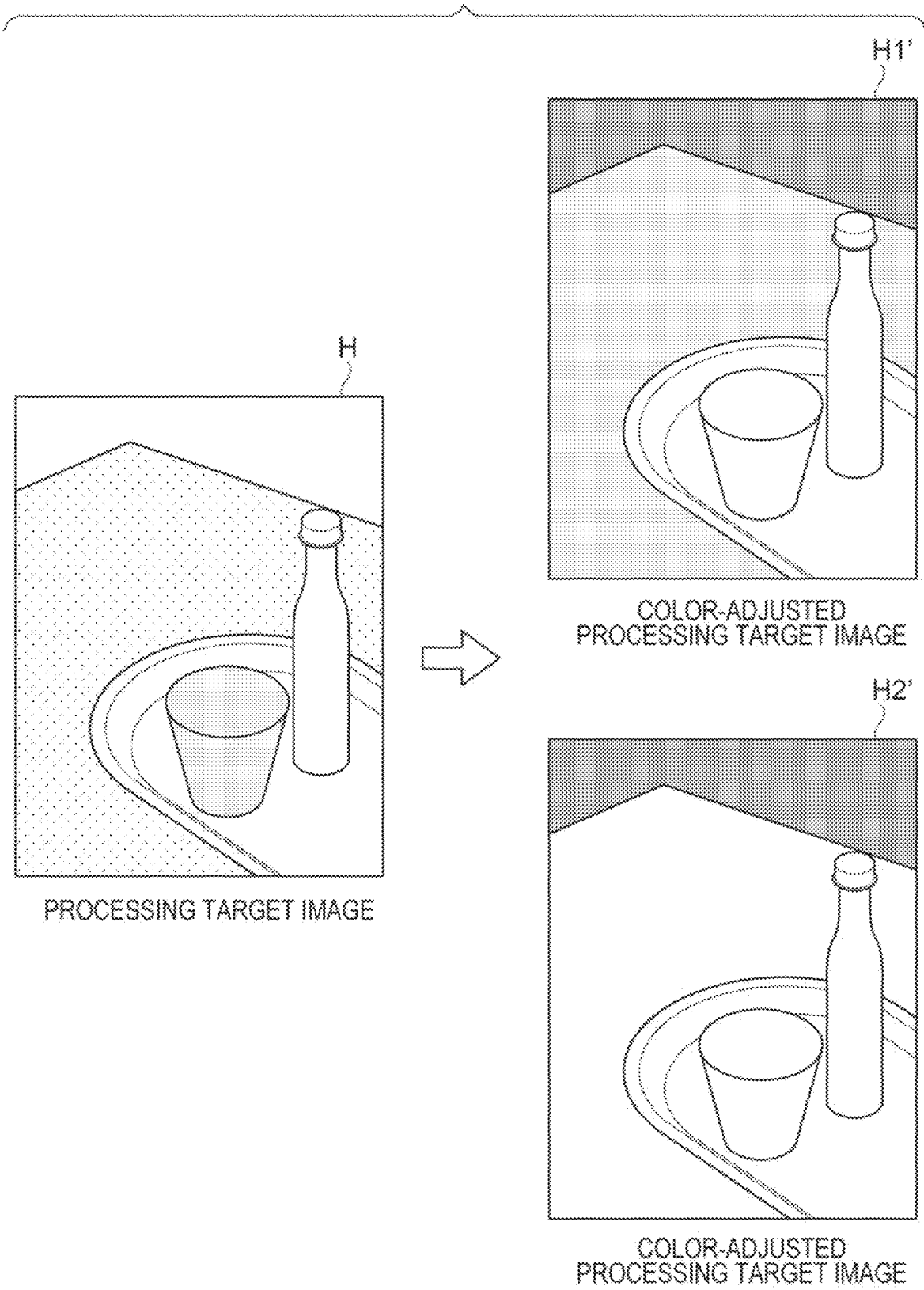
FIG. 12 illustrates a second example of the process that is performed when the user selects a sense term on the map.

FIG. 12 illustrates a second example of the process that is performed when the user selects the sense term Ky on the map Mp.

When multiple color scheme images M, such as two color bars Cba2 and Cba3, are displayed as illustrated in FIG. 10, the color-adjusted processing target images H1' and H2' are presented to the user. The user may thus be enabled to select one of the two images.

Figure 13:
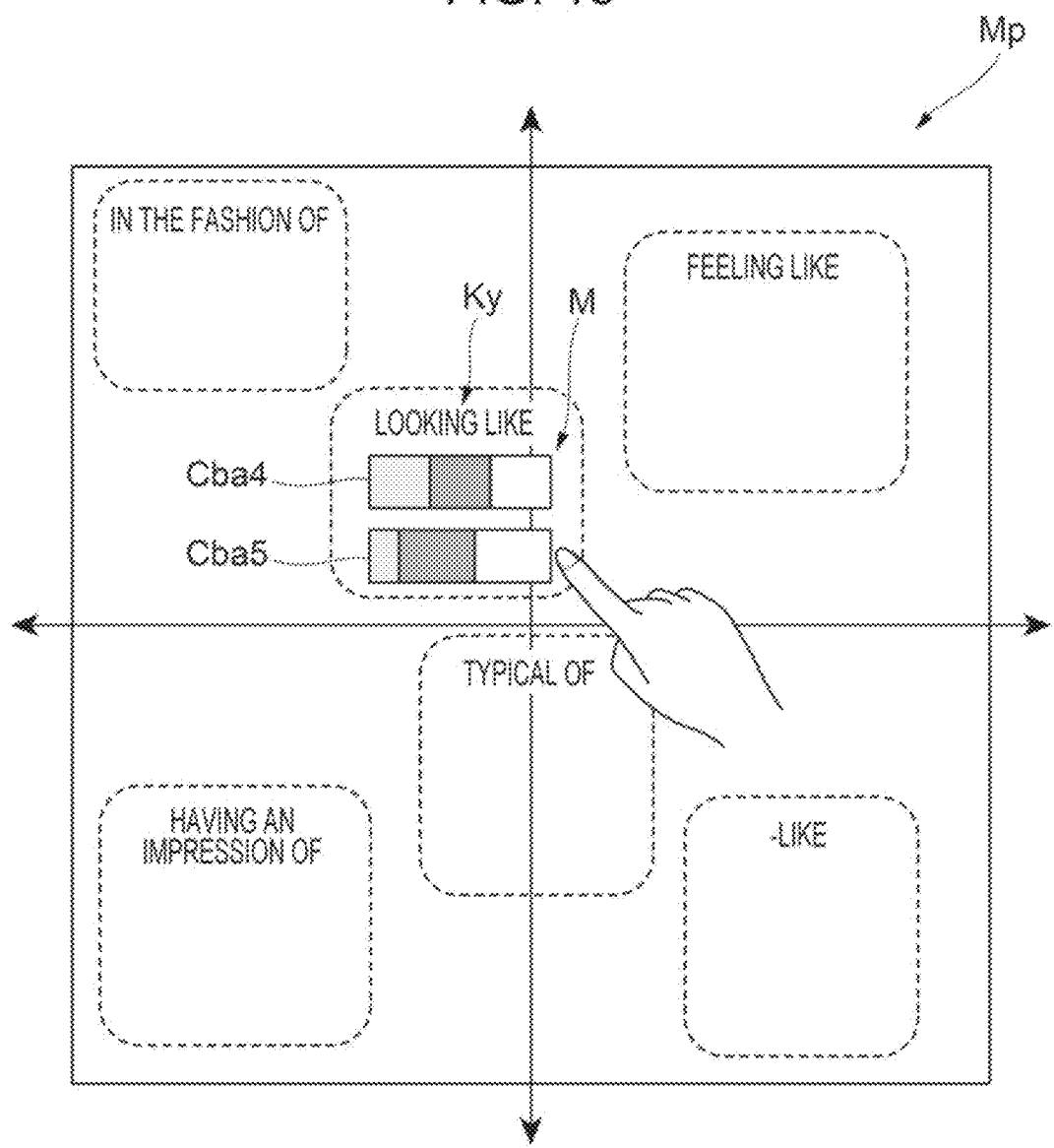
FIG. 13 illustrates a third example of the process that is performed when the user selects a sense term on the map.

FIG. 13 illustrates a third example of the process that is performed when the user selects the sense term Ky on the map Mp.

Two color bars Cba4 and Cba5 are displayed as the color scheme images M and the user may be enabled to select one of the two. The color scheme images M may be displayed in advance or when the user touches the color scheme images M.

Figure 14:
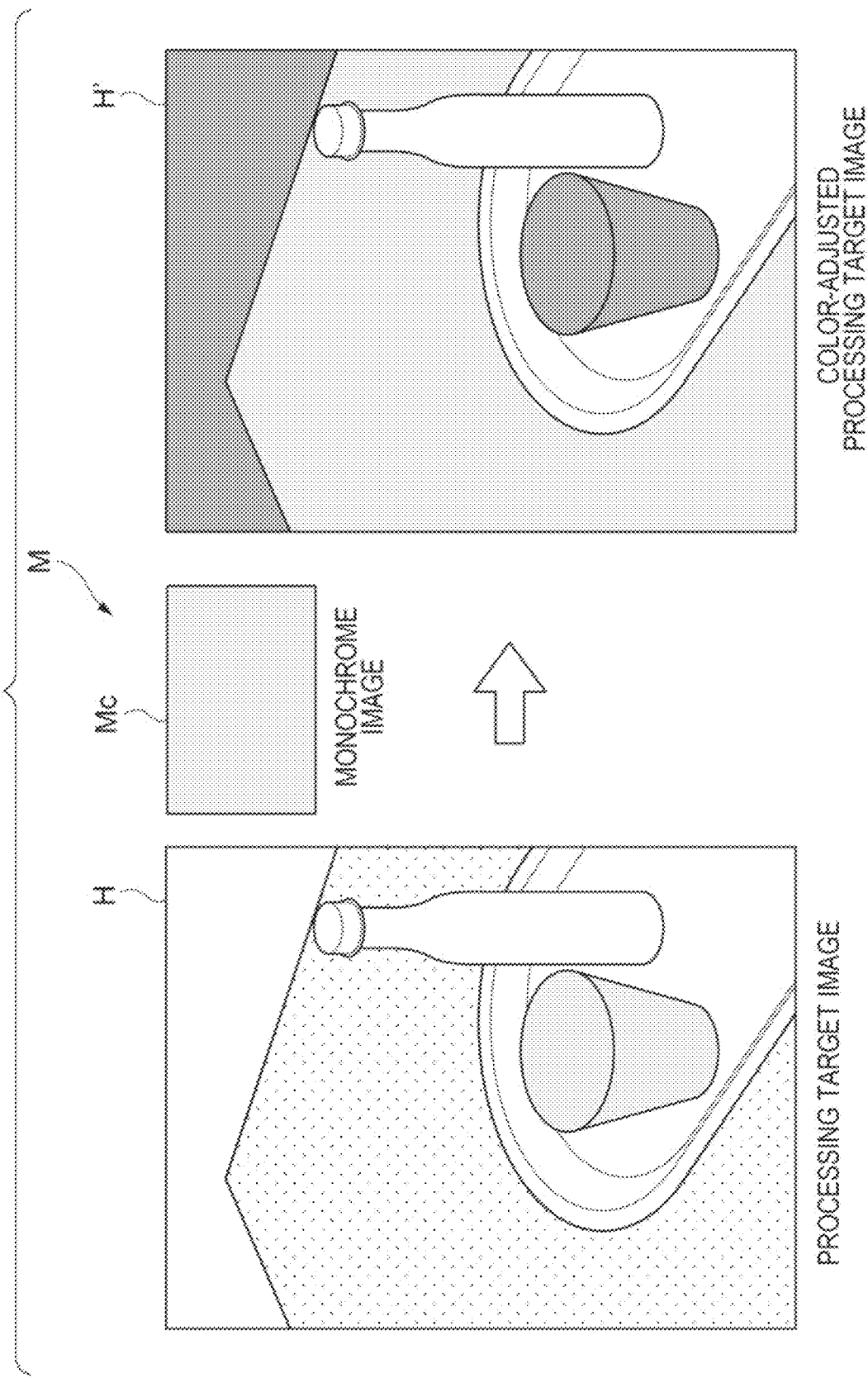
FIG. 14 illustrates a fourth example of the process that is performed when the user selects a sense term on the map.

FIG. 14 illustrates a fourth example of the process that is performed when the user selects the sense term Ky on the map Mp.

The map Mp does not include the color scheme image M including the sample colors Mc but includes the color scheme image M including a single sample color Mc. The sample color Mc is monochrome and may be associated with sepia tone. When the arithmetic mean and standard deviation are calculated, the calculation may be performed in a manner such that the monochrome image has subtle gradations. Alternatively, the chromaticity of the monochrome may be simply applied.

Figure 15:
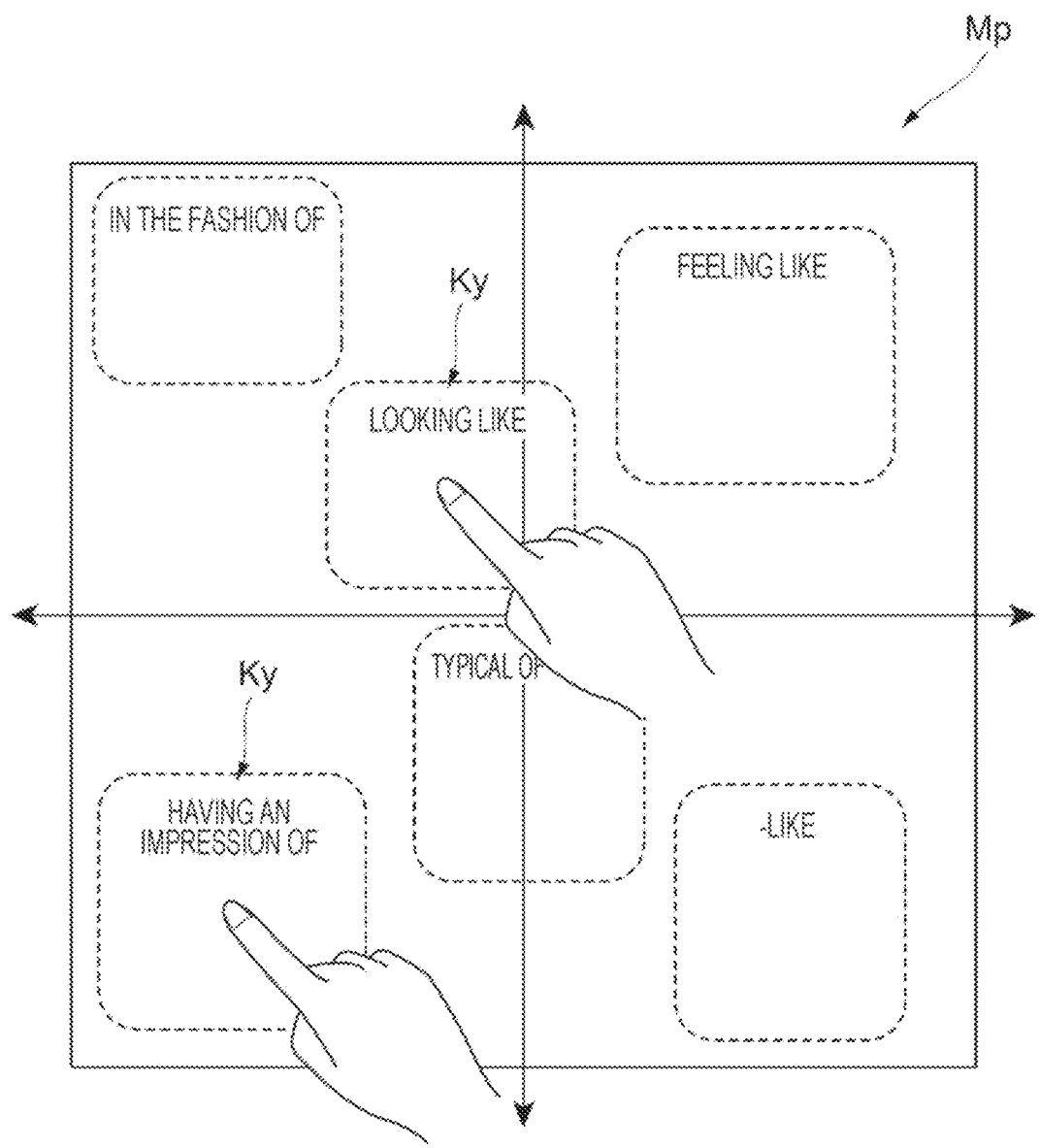
FIG. 15 illustrates a fifth example of the process that is performed when the user selects a sense term on the map.

FIG. 15 illustrates a fifth example of the process that is performed when the user selects the sense term Ky on the map Mp.

Referring to FIG. 15, two sense terms Ky "looking like" and "having an impression of" are selected.

Referring to FIG. 16A, color bars Cba6 and Cba7 correspond to the two sense terms Ky. Samples colors Mc5, Mc6, and Mc7 of the color bar Cba6 are averaged and sample colors Mc8, Mc9, and Mc10 of the color bar Cba7 are averaged to determine a new color bar Cba8. Herein, the mean of the sample colors Mc5 and Mc8, the mean of sample colors Mc6 and Mc9, and the mean of sample colors Mc7 and Mc10 are respectively determined. As a result, sample colors Mc11, Mc12, and Mc13 are created. The sample colors Mc5, Mc6, and Mc7 forming the color bar Cba6 and the sample colors Mc8, Mc9, and Mc10 forming the color bar Cba7 are averaged without being weighted. Alternatively, the sample colors may be weight-averaged.

Referring to FIG. 16B, the sample colors Mc5, Mc6, Mc7, Mc8, Mc9, and Mc10 forming the color bars Cba6 and Cba7 may be simply concatenated to create a new color bar Cba9. In this case, the color bar Cba9 includes six sample colors Mc.

Third Exemplary Embodiment

A third exemplary embodiment is described below. According to the third exemplary embodiment, the user may specify a region where the color adjustment is to be performed on the processing target image H.

Figure 17:
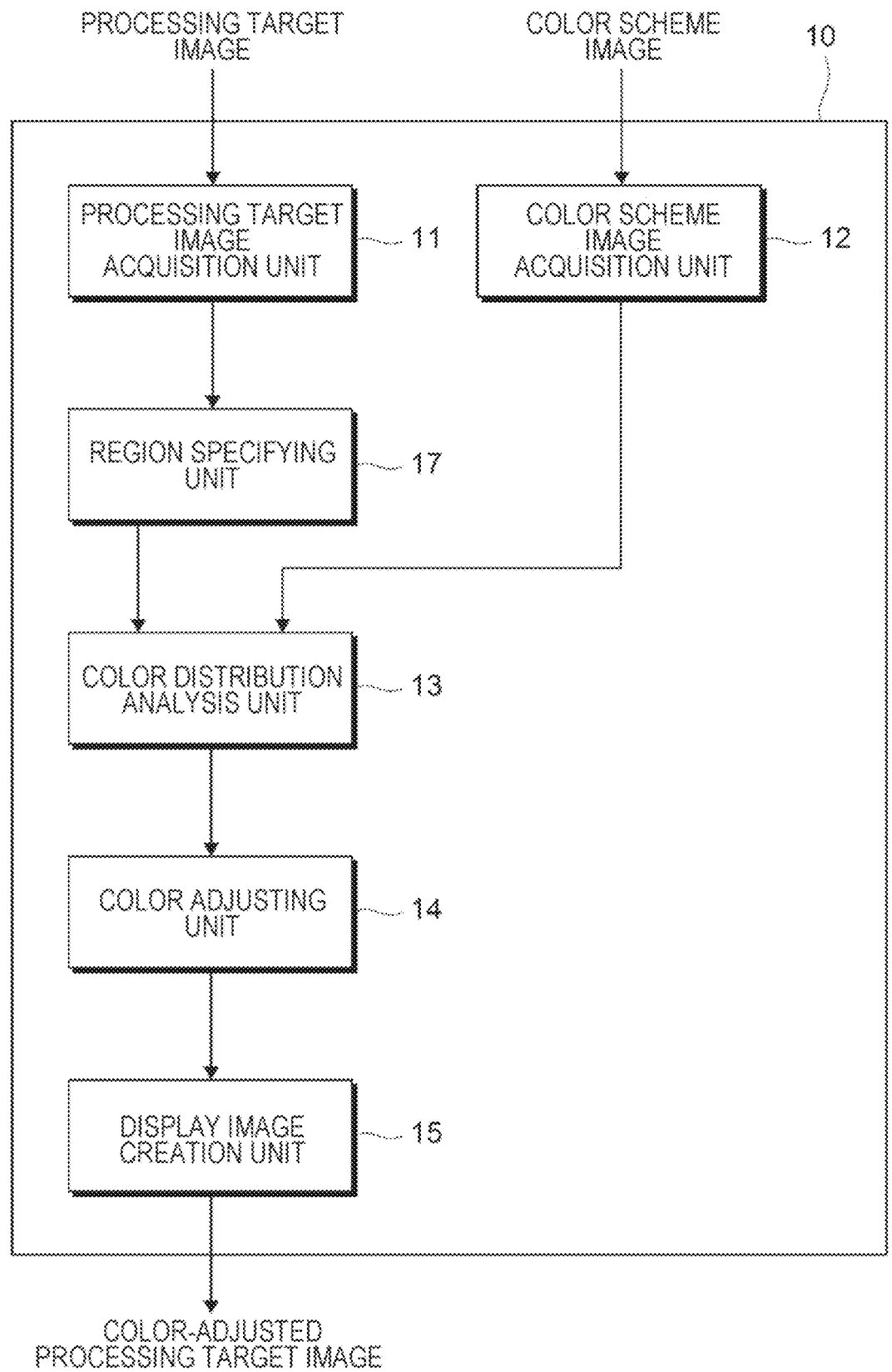
FIG. 17 is a functional block diagram illustrating an image processing apparatus of a third exemplary embodiment.

FIG. 17 is a functional block diagram illustrating an image processing apparatus 10 of the third exemplary embodiment.

Referring to FIG. 17, the image processing apparatus 10 of the third exemplary embodiment is different from the image processing apparatus 10 in FIG. 2 in that the image processing apparatus 10 of the third exemplary embodiment includes a region specifying unit 17. The functions of the processing target image acquisition unit 11, color scheme image acquisition unit 12, color distribution analysis unit 13, color adjusting unit 14, and display image creation unit 15 remain unchanged from those of the image processing apparatus 10 in FIG. 2. The following discussion focuses on the region specifying unit 17.

In response to an instruction from the user, the region specifying unit 17 specifies a region that the user may or may not desire to perform the color adjustment in the processing target image H. Specifically, if the user specifies in the processing target image H the region on which the user desires to make the color adjustment, the region is going to undergo the color adjustment while the other region is going to not. If the user specifies in the processing target image H the region on which the user does not desire to make the color adjustment, the region is going to not undergo the color adjustment while the other region is going to. The latter case is described below. The former case is identical to the latter case except that the region to be color-adjusted or the region not to be color-adjusted are reversed.

If the user specifies in the processing target image H the region where the user does not desire to make the color adjustment, the user may specify the region on the processing target image H displayed on the display screen 21, using the input apparatus 30, such as a mouse. The region specifying unit 17 creates a mask on the region specified by the user.

Figure 18:
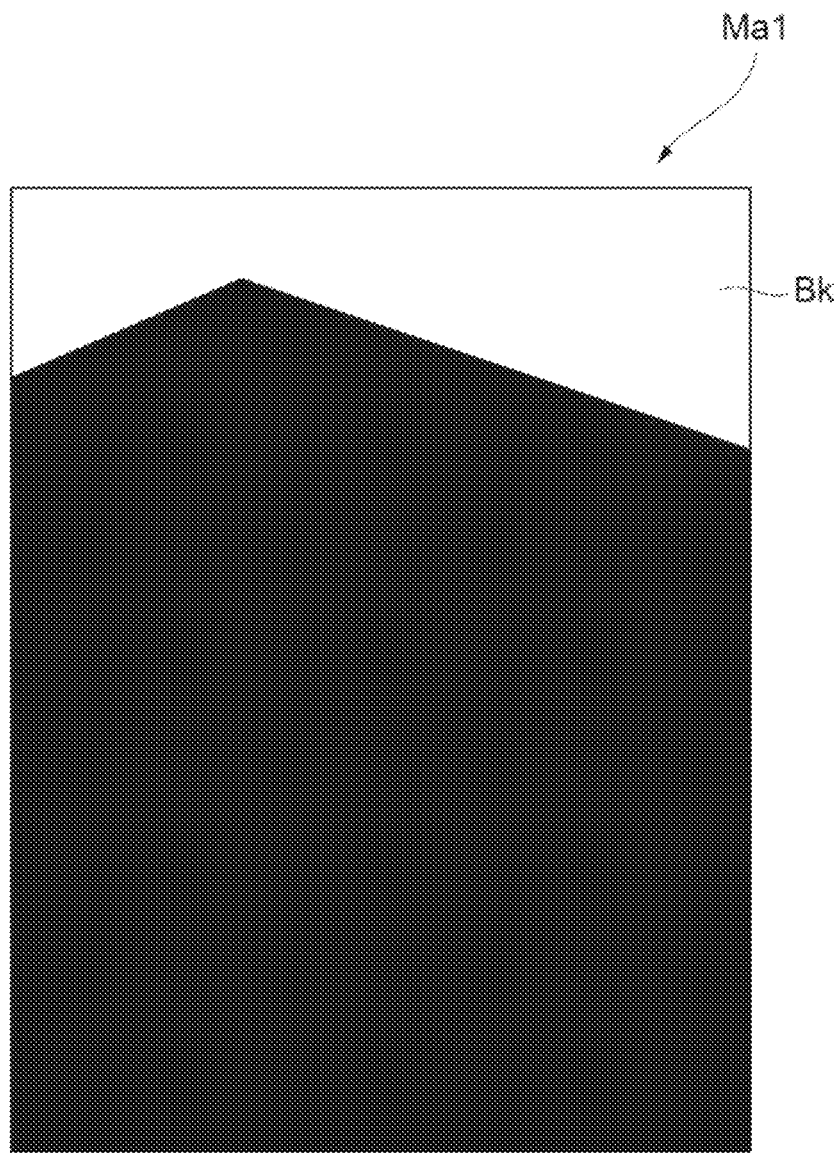
FIG. 18 illustrates a first example of a mask.

FIG. 18 illustrates a first example of a mask Ma1.

Figure 19:
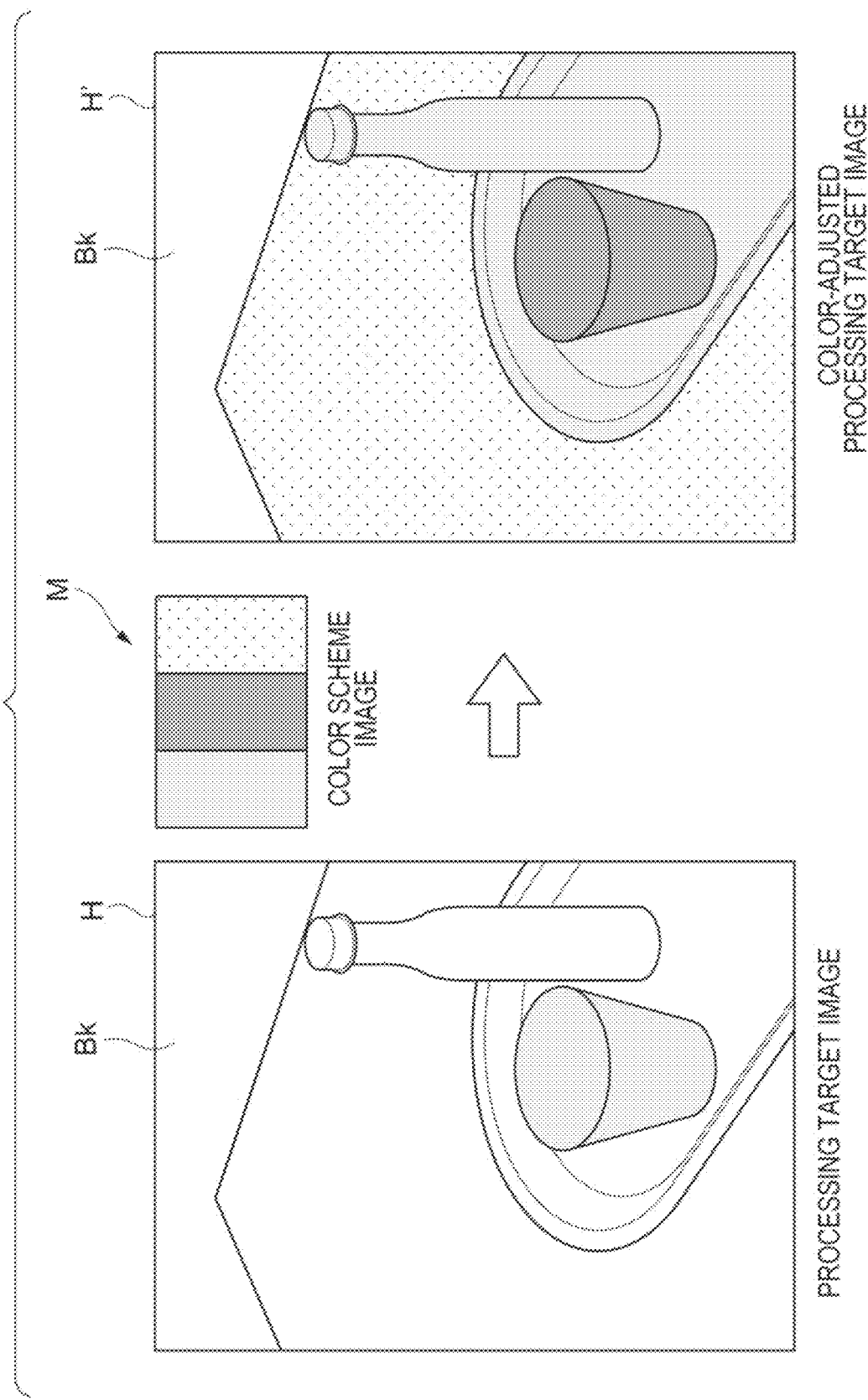
FIG. 19 illustrates results that are obtained when the color adjustment is performed using the mask in FIG. 18.

FIG. 19 illustrates results that are obtained when the color adjustment is performed using the mask Ma1 in FIG. 18. The mask Ma1 in FIG. 18 is applied to the processing target image H in the processing target image H on the left-hand side of FIG. 19. The mask Ma1 is used not to perform the color adjustment on a background region Bk of the processing target image H. As a result, in the color-adjusted processing target image H' on the left-hand side of FIG. 19, the background region Bk is not color-adjusted and the other region is color-adjusted.

Figure 20:
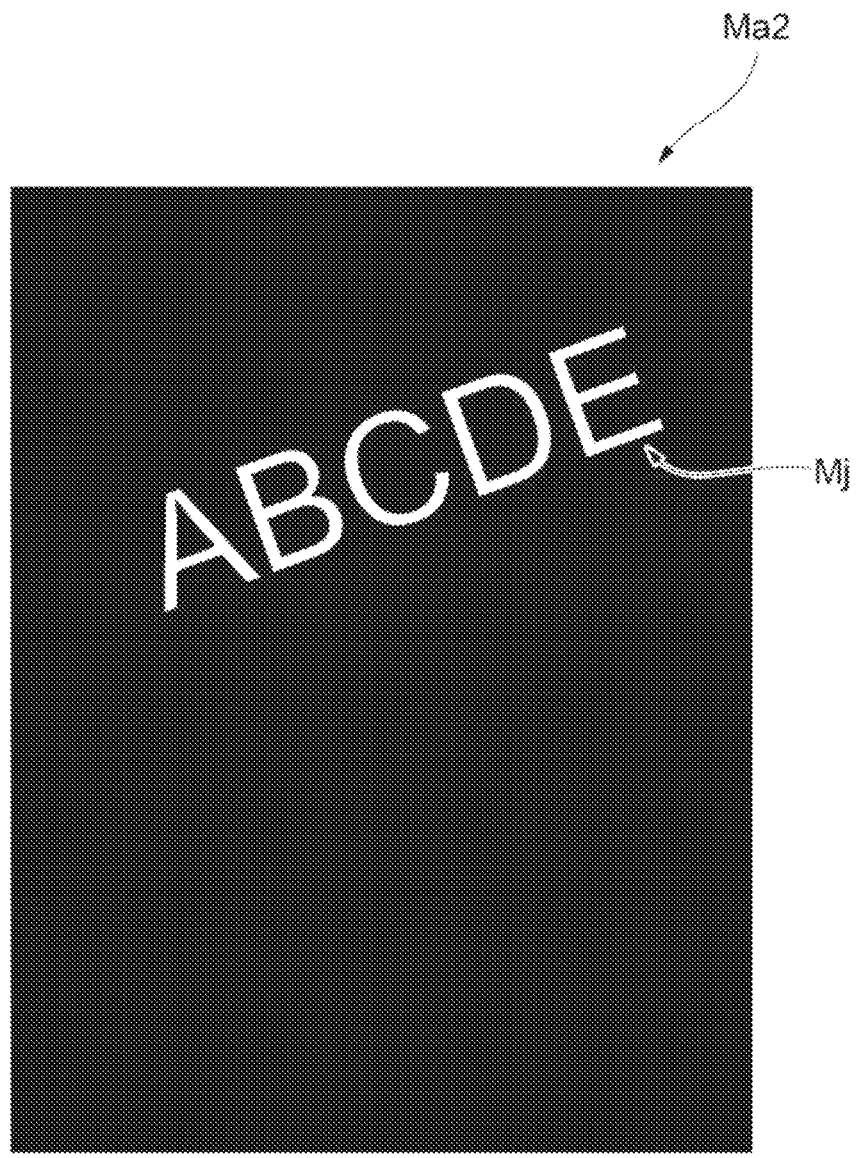
FIG. 20 illustrates a second example of the mask.
Figure 21:
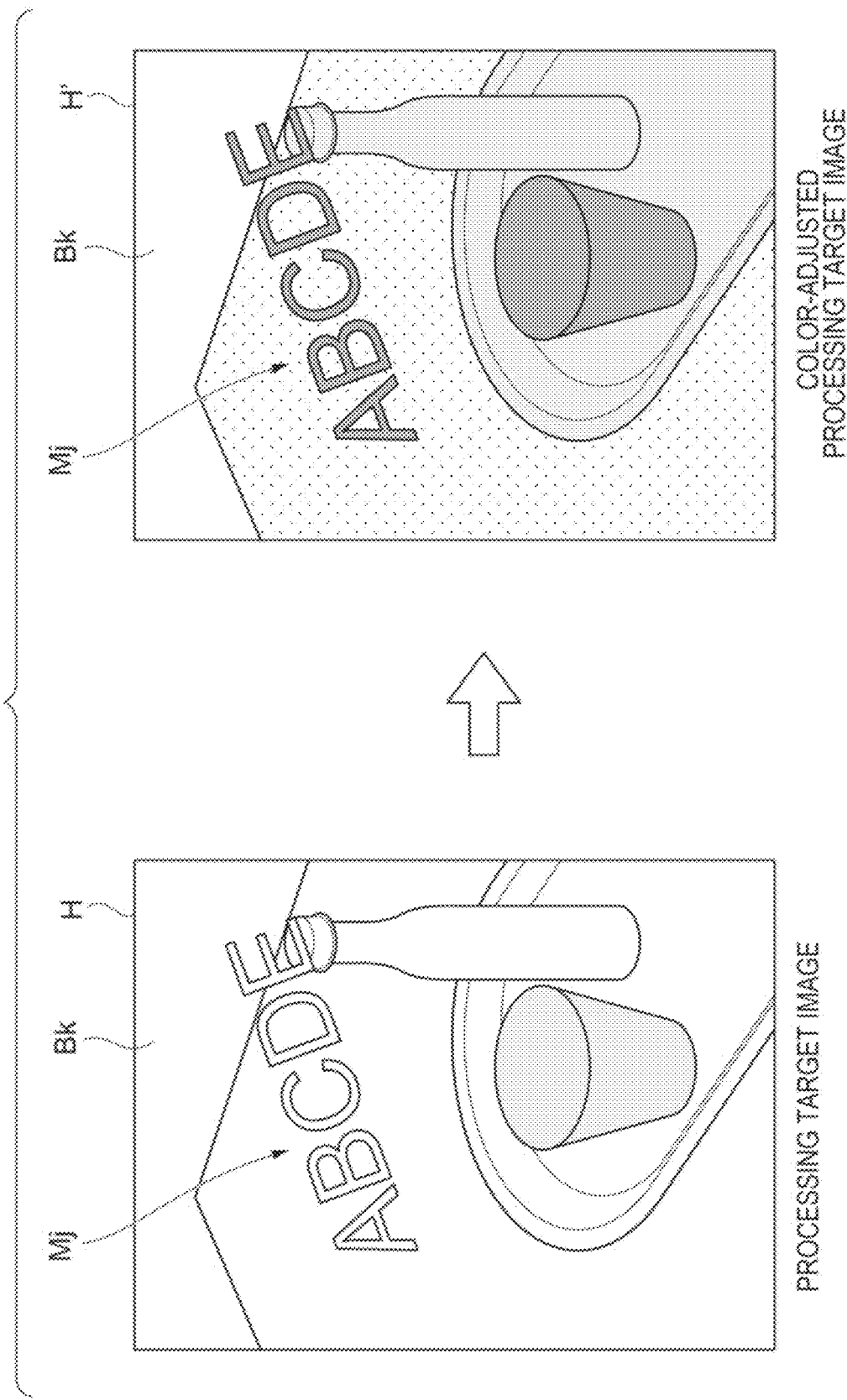
FIG. 21 illustrates results that are obtained when the color adjustment is performed using the masks in FIGS. 18 and 20.

FIG. 20 illustrates a second example of the mask. FIG. 21 illustrates results that are obtained when the color adjustment is performed using the masks in FIGS. 18 and 20. The mask Ma2 in FIG. 20 is applied to the processing target image H on the left-hand side of FIG. 21. In this case, the mask Ma2 is applied to a character region Mj of the processing target image H. The color adjustment is configured not to be performed on the character region Mj. The character region Mj is thus color-adjusted such that the character region Mj is different in color from the other region using the mask Ma2 in FIG. 20, for example, may be set to be in a directly specified color. The color-adjusted processing target image H' in FIG. 21 may be color-adjusted in a similar fashion as in FIG. 19 using the mask Ma1 while the character region Mj is color-adjusted to be in a color different from the other region using the mask Ma2.

Fourth Exemplary Embodiment

A fourth exemplary embodiment is described below. According to the fourth exemplary embodiment, a user interface (UI) used to actually perform the color adjustment is described.

Figure 22:
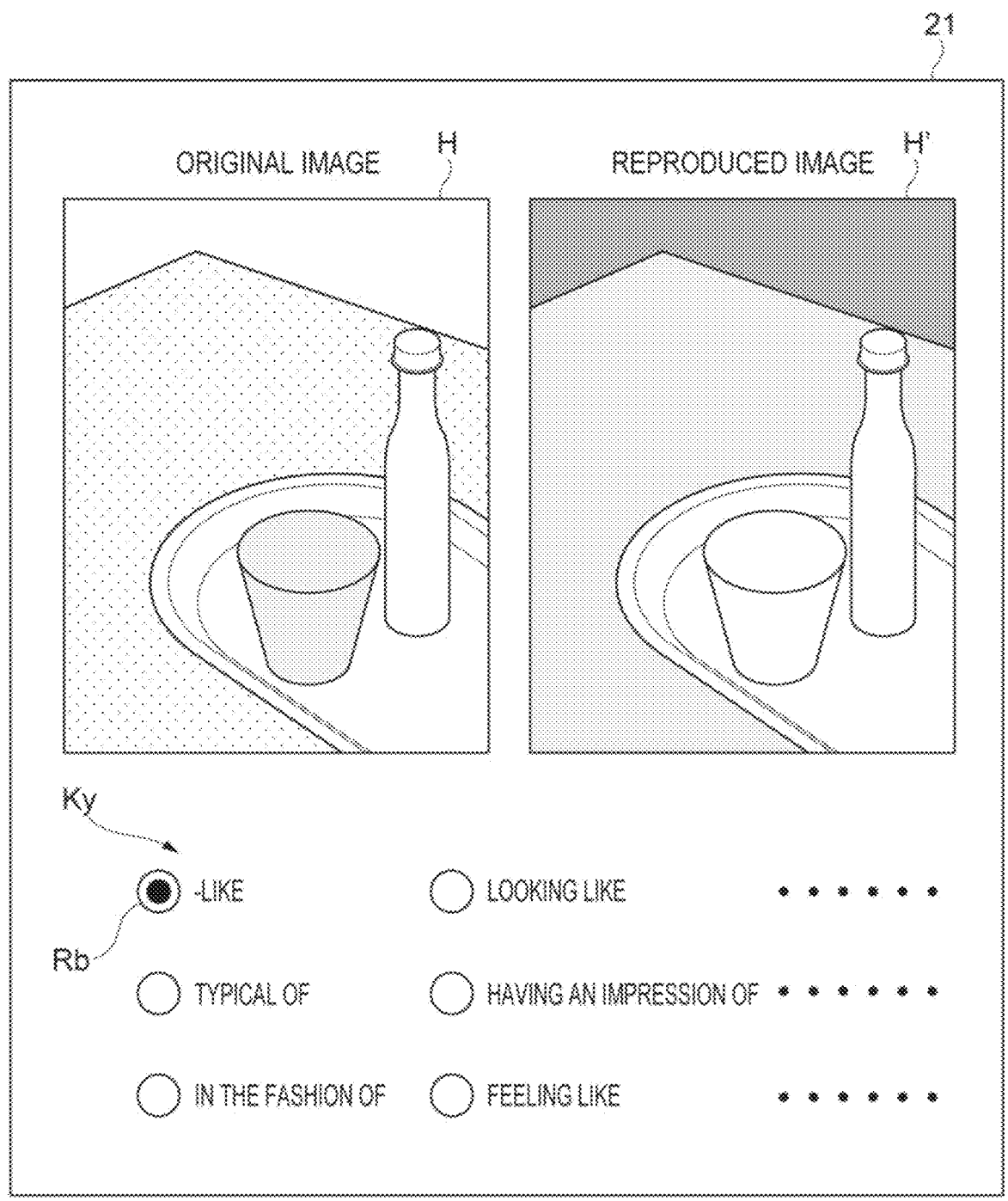
FIG. 22 illustrates a first example of a screen displayed on a display when the color scheme image is selected.

FIG. 22 illustrates a first example of a screen displayed on the display screen 21 of the display 20 when the color scheme image M is selected.

The processing target image H (herein an original image) is displayed on the top-left portion of the display screen 21 and the color-adjusted processing target image H' (herein a reproduced image) is displayed on the top-right portion of the display screen 21. A list of the sense terms Ky is displayed on the bottom portion of the display screen 21. If the user presses a radio button Rb, a corresponding sense term Ky is selected and a corresponding color scheme image M is selected. The color scheme image M is not displayed herein. Alternatively, a check button may be used instead of the radio button.

Figure 23:
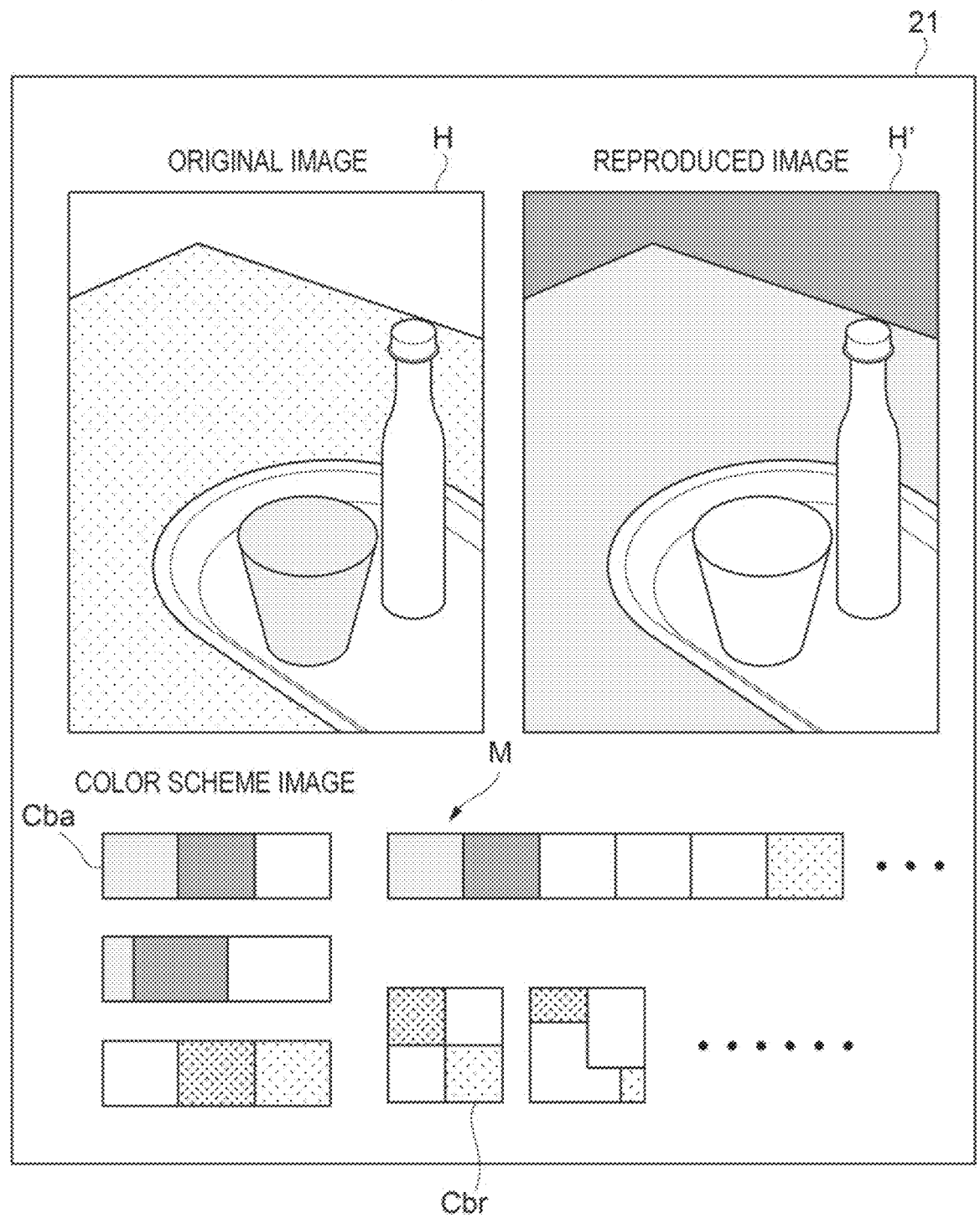
FIG. 23 illustrates a second example of the screen displayed on the display when the color scheme image is selected.

FIG. 23 illustrates a second example of the screen displayed on the display screen 21 of the display 20 when the color scheme image M is selected. In comparison with the first example of the screen in FIG. 22, the color bars Cba and Cbr are displayed as the color scheme image M on the bottom portion of the display screen 21. When the user touches one of the color bars Cba and Cbr, the color scheme image M is selected.

Figure 24:
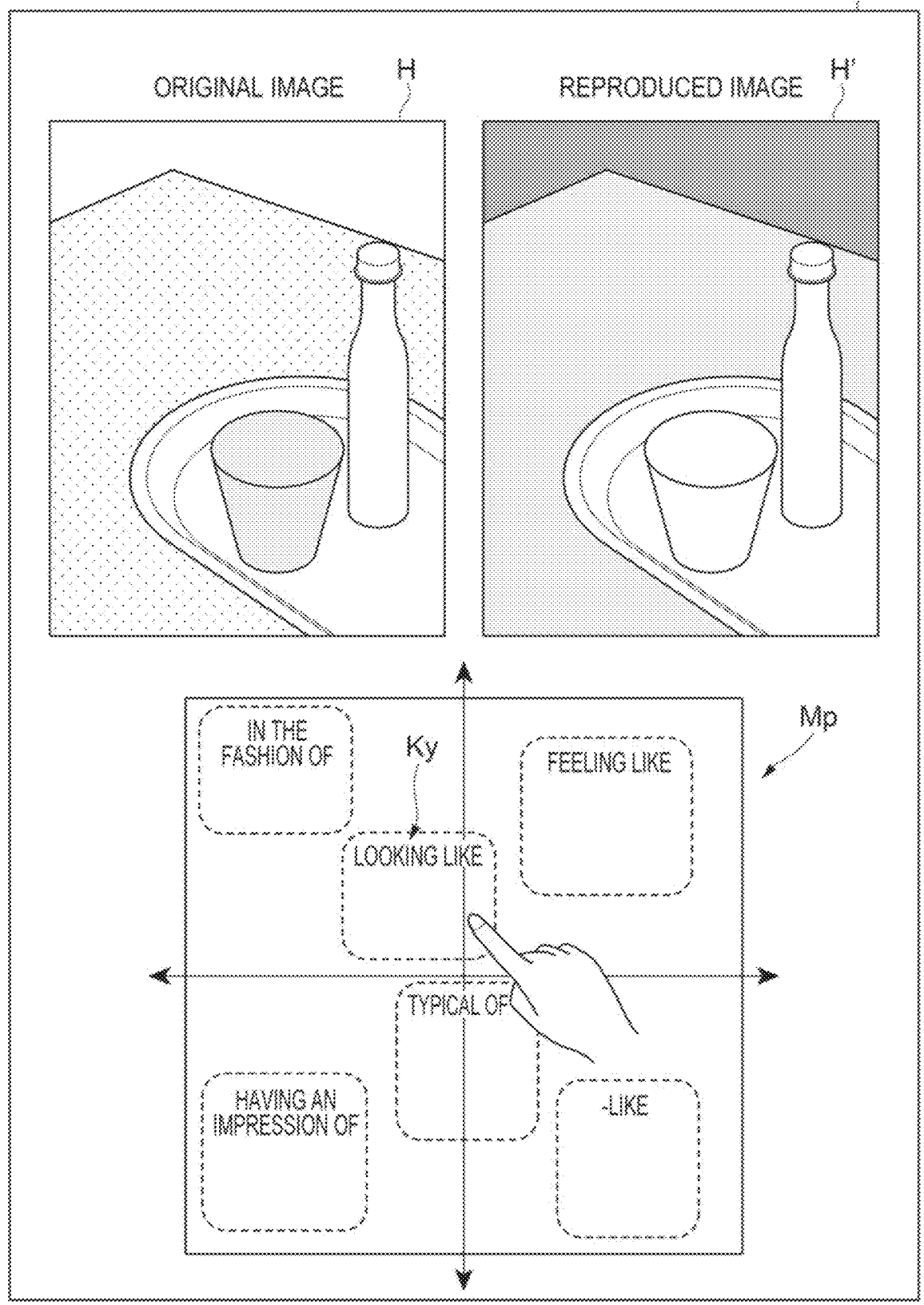
FIG. 24 illustrates a third example of the screen displayed on the display when the color scheme image is selected.

FIG. 24 illustrates a first example of the screen displayed on the display screen 21 of the display 20 when the color scheme image M is selected.

In comparison with the first example of the screen in FIG. 22, the sense terms Ky are displayed on the map Mp indicating the preference model on the bottom portion of the display screen 21. If the user touches a region of any sense term Ky, a corresponding color scheme image M is selected. The color scheme image M is not displayed herein.

Process of Image Processing System

The process of the image processing system 1 is described below.

Figure 25:
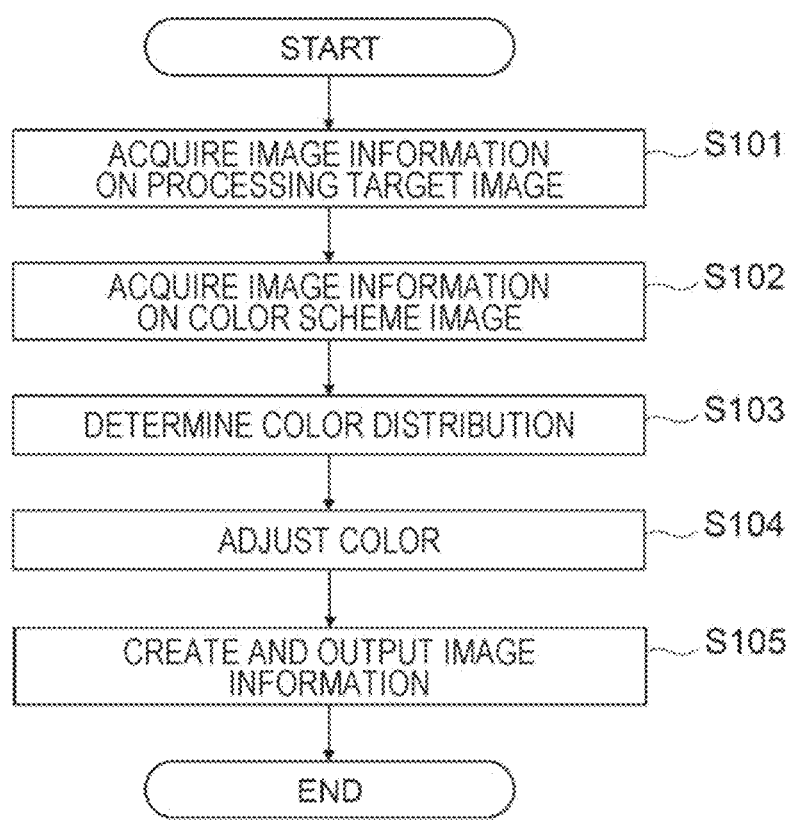
FIG. 25 is a flowchart illustrating a process performed by the image processing system.

FIG. 25 is a flowchart illustrating the process performed by the image processing system 1. The processing target image acquisition unit 11 acquires the image information on the processing target image H (step S101). In this case, the user selects the processing target image H and the processing target image acquisition unit 11 acquires the image information. As in the third exemplary embodiment, the user may specify in the processing target image H the region the user desires to perform (or not perform) and the region specifying unit 17 may create the mask.

The color scheme image acquisition unit 12 acquires the image information on the color scheme image M (step S102). According to the first exemplary embodiment, the user selects the color bar Cba or the color block Cbr as the color scheme image M. According to the second exemplary embodiment, the user selects the sense term Ky. In this case, the term conversion unit 16 retrieves the color scheme image M from the memory in accordance with the sense term Ky and transfers the sense term Ky to the color scheme image acquisition unit 12.

The color distribution analysis unit 13 determines the color distributions for the processing target image H and the color scheme image M (step S103). For example, the color distribution analysis unit 13 determines the arithmetic mean and the standard deviation as the color distribution.

The color adjusting unit 14 performs the color adjustment to reflect the color scheme of the color scheme image M on the color scheme of the processing target image H (step S104). The display image creation unit 15 creates the image information color-adjusted by the color adjusting unit 14 and then outputs the color-adjusted image information (step S105).

According to the exemplary embodiments, the image processing apparatus 10 selects the color scheme image M that reflects the sample colors. The user may thus easily color-adjust the processing target image H. According to the second exemplary embodiment, the user may easily perform the color adjustment on the processing target image H by selecting the sense term Ky.

The workload of the user is reduced more by reflecting the color scheme pattern prepared in advance on the color scheme of the processing target image H than when the user adjusts the color of the processing target image H and the modified color.

Program

The process of the image processing apparatus 10 of the exemplary embodiments is implemented when software resources cooperate with hardware resources. Specifically, the CPU in the image processing apparatus 10 executes a program implementing the functions of the image processing apparatus 10 and thus performs the functions.

The process of the image processing apparatus 10 may be construed as a program that causes a computer to implement the function of determining a color distribution of the processing target image H and a color distribution of the sample colors Mc prepared in advance as a set and a function of performing an operation to modify the color of the processing target image H in accordance with the color distribution of the processing target image H and the color distribution of the sample colors Mc.

In the exemplary embodiments described above, the arithmetic mean is used as the mean. Alternatively, the geometric mean may be used. The standard deviation is used as the dispersion. Alternatively, other statistics, such as root-mean-square values or variance, may be used.

In the exemplary embodiments described above, the color distribution analysis unit 13 converts the RGB data into $L\alpha\beta$ data. Any chromaticity data, if separable into a chromaticity component and a luminance component, may be used instead of the $L\alpha\beta$ data. For example, the RGB data may be converted into CIE $L^*a^*b^*$ data, IPT data, CAMO2 data, or HSV data.

In the exemplary embodiments above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising a processor configured to
    determine a color distribution of a processing target image and a color distribution of a plurality of sample colors prepared in advance as a set,
    perform an operation to modify a color of the processing target image in accordance with a relationship between the color distribution of the processing target image and the color distribution of the sample colors, and
    adjust a feature value of the processing target image in view of a feature value of the sample colors, wherein the feature values include a mean or a dispersion of the processing target image and a mean or a dispersion of the sample colors.

2. The image processing apparatus according to claim 1, wherein the processor is configured to
    cause a display to display side by side the processing target image and an image of the color samples, and
    perform the operation in accordance with the color samples selected by a user.

3. The image processing apparatus according to claim 2, wherein the image of the color samples is displayed with the color samples in a form of a color bar or a color block.

4. The image processing apparatus according to claim 2, wherein the image of the color samples represents a weight of each color sample by an area filled with the color sample, the weight being used when the color sample is reflected in the operation.

5. The image processing apparatus according to claim 4, wherein the area is modifiable by the user.

6. The image processing apparatus according to claim 2, wherein another color is addable to the sample colors by the user.

7. The image processing apparatus according to claim 1, wherein the processor is configured to
    receive a term representing an impression of an image and acquire the sample colors in accordance with the term.

8. The image processing apparatus according to claim 7, wherein the processor is configured to acquire the sample colors from a memory that links the term and the sample colors in accordance with a specific sense and stores the term and the sample colors in a linked form, wherein specific sense relates to an impression or perception of a user.

9. The image processing apparatus according to claim 1, wherein the processor is configured to receive results about a region of the processing target image which the user has specified to perform the operation.

10. The image processing apparatus according to claim 1, wherein the processor is configured to perform the operation by weighting the sample colors.

11. The image processing apparatus according to claim 10, wherein the processor is configured to, in the operation, attach a higher weight to a color closer to a color appearing with highest occurrence of frequency in the processing target image than remaining sample colors.

12. The image processing apparatus according to claim 10, wherein the processor is configured to adjust in response to the weighting a feature value of the processing target image in view of a feature value of the sample colors.

13. An image processing system comprising a display displaying an image and an image processing apparatus performing image processing on a processing target image displayed on the display,
    wherein the image processing apparatus comprises a processor configured to
    determine a color distribution of a processing target image and a color distribution of a plurality of sample colors prepared in advance as a set,
    perform an operation to modify a color of the processing target image in accordance with a relationship between the color distribution of the processing target image and the color distribution of the sample colors, and
    adjust a feature value of the processing target image in view of a feature value of the sample colors, wherein the feature values include a mean or a dispersion of the processing target image and a mean or a dispersion of the sample colors.

14. A non-transitory computer readable medium storing a program causing a computer to execute a process for processing an image, the process comprising:
    determining a color distribution of a processing target image and a color distribution of a plurality of sample colors prepared in advance as a set,
    performing an operation to modify a color of the processing target image in accordance with a relationship between the color distribution of the processing target image and the color distribution of the sample colors, and adjust a feature value of the processing target image in view of a feature value of the sample colors, wherein the feature values include a mean or a dispersion of the processing target image and a mean or a dispersion of the sample colors.

* * * * *